(12) United States Patent
Zhang et al.

(10) Patent No.: US 9,531,257 B2
(45) Date of Patent: Dec. 27, 2016

(54) POWER FACTOR CORRECTOR WITH HIGH POWER FACTOR AT LOW ROAD OR HIGH MAINS VOLTAGE CONDITIONS

(75) Inventors: Cheng Zhang, Nijmegen (NL); Hans Halberstadt, Groesbeek (NL)

(73) Assignee: NXP B.V., Eindhoven (NL)

(*) Notice: Subject to any disclaimer, the term of this patent is extended or adjusted under 35 U.S.C. 154(b) by 21 days.

(21) Appl. No.: 13/513,992

(22) PCT Filed: Dec. 28, 2010

(86) PCT No.: PCT/IB2010/056097
§ 371 (c)(1),
(2), (4) Date: Jun. 5, 2012

(87) PCT Pub. No.: WO2011/080702
PCT Pub. Date: Jul. 7, 2011

(65) Prior Publication Data
US 2012/0300517 A1  Nov. 29, 2012

Related U.S. Application Data

(63) Continuation-in-part of application No. 12/647,958, filed on Dec. 28, 2009, now Pat. No. 8,351,232.

(51) Int. Cl.
*H02M 1/42* (2007.01)
*G05F 5/00* (2006.01)
(Continued)

(52) U.S. Cl.
CPC ............ *H02M 1/4225* (2013.01); *G05F 5/00* (2013.01); *H02M 3/156* (2013.01);
(Continued)

(58) Field of Classification Search
CPC ............... G05F 5/00; H02M 1/4225; H02M 2001/0025; H02M 2001/0032; H02M 3/156
(Continued)

(56) References Cited

U.S. PATENT DOCUMENTS 5,245,522 A * 9/1993 Kawaguchi ......... H02M 1/4225
                                              323/207
5,371,666 A   12/1994 Miller
(Continued)

FOREIGN PATENT DOCUMENTS

| CN | 1820406 A   | 8/2006  |
| CN | 1959583 A   | 5/2007  |
| CN | 101282079 A | 10/2008 |

OTHER PUBLICATIONS

NXP; "Tea 1750—Product Data Sheet"; 29 pages (Apr. 6, 2007).
(Continued)

*Primary Examiner* — Jue Zhang
*Assistant Examiner* — Lakaisha Jackson

(57) ABSTRACT

A power factor corrector raises power factor at low loads or high mains voltages by modifying the switch timing or the current received by the power converter. It achieves this by increasing the switch-on time of a control switch during the falling time so that the majority of the switch-on time during a mains period occurs during the falling time, to thereby control the current received by the converter to compensate for current received by the intermediate filter. Some embodiments may employ a feedback system to produce one or more error signals that modify the control signal used to control the operation of the converter. Various embodiments may also include additional stages that limit the compensation range of the error signal.

9 Claims, 19 Drawing Sheets

(51) Int. Cl.
*H02M 3/156* (2006.01)
*H02M 1/00* (2006.01)

(52) U.S. Cl.
CPC ............... *H02M 2001/0025* (2013.01); *H02M 2001/0032* (2013.01); *Y02B 70/126* (2013.01); *Y02B 70/16* (2013.01)

(58) Field of Classification Search
USPC .... 323/222, 282, 284, 285, 299; 363/80, 84, 363/89
See application file for complete search history.

(56) References Cited

U.S. PATENT DOCUMENTS

| | | | |
|---|---|---|---|
| 5,594,630 A * | 1/1997 | Baker | H02J 3/01 307/105 |
| 6,900,623 B2 | 5/2005 | Yang et al. | |
| 7,268,526 B1 * | 9/2007 | Smith | H02M 3/156 323/284 |
| 7,295,452 B1 | 11/2007 | Liu | |
| 7,580,272 B2 | 8/2009 | Taguchi | |
| 7,898,237 B2 | 3/2011 | Shao et al. | |
| 7,903,433 B2 * | 3/2011 | Carpenter | H02M 1/1584 363/16 |
| 7,936,575 B2 * | 5/2011 | Hu | H02M 3/33592 363/21.06 |
| 8,063,684 B2 * | 11/2011 | Ting | H02M 3/156 323/284 |
| 2005/0007083 A1 | 1/2005 | Yang et al. | |
| 2007/0103947 A1 | 5/2007 | Taguchi et al. | |
| 2008/0211462 A1 * | 9/2008 | Ng | G05F 1/70 323/207 |
| 2008/0246444 A1 | 10/2008 | Shao et al. | |
| 2010/0124080 A1 * | 5/2010 | Yeh | H02M 3/33507 363/21.12 |
| 2011/0157940 A1 | 6/2011 | Zhang | |
| 2011/0267856 A1 | 11/2011 | Pansier | |

OTHER PUBLICATIONS

Kim, J.W., et al.; "Variable On-time Control of the Critical Conduction Mode Boost Power Factor Correction Converter to Improve Zero-crossing Distortion"; Power Elec. and Drives 2005, Intl. Conf. on Kuala Lumpur, Malaysia; IEEE, Piscataway, NJ, US; vol. 2, pp. 1542-1546; (Nov. 28, 2005).
Lai, J-S, et al.; "Design Consideration for Power Factor Correction Boost Converter Operating at the Boundary of Continuous Conduction Mode and Discontinuous Conduction Mode"; Proc. of Annual Applied Power Elec. Conf. and Expo., San Diego, CA, US; IEEE, New York, NY, US; vol. Conf. 8; pp. 267-273 (Mar. 7, 2003).
International Search Report and Written Opinion for application PCT/IB2010/056097 (Jun. 30, 2012).
Extended European Search Report issued May 2, 2014 in European Patent Application 13153614.6-1804/2605387.

* cited by examiner

POWER FACTOR CORRECTOR WITH HIGH POWER FACTOR AT LOW ROAD OR HIGH MAINS VOLTAGE CONDITIONS

TECHNICAL FIELD

Embodiments disclosed herein relate generally to a power electronic circuit and power factor correction.

BACKGROUND

Engineers have historically converted general electric alternating-current (AC) power (mains power) into direct-current (DC) power for use by a multitude of consumer devices. A power management system converts AC power from the main source into DC power using components with low losses in power dissipation, such as, for example, inductors, diodes, capacitors, transformers and other switches (JFETs, MOSFETs, etc.). Engineers may decrease the losses in the main source by focusing on the harmonics of the current drawn from the main source and the phase relationship between the mains voltage and the current drawn from the main source; the efficiency of the mains power supplying is measured by the power factor. The power factor of an AC to DC electric power system may be defined as a ratio of the real power drawn from the main source compared to the product of the root means square (rms) voltage $V_{rms}$ and current $I_{rms}$.

A power factor corrector (PFC), which may mainly consist of a bridge rectifier, a switch-mode power supply (SMPS), and control circuits, is widely used to help maximize power factor in power management systems and has been used for power management in personal computers, adapters and lighting. Power factor, therefore, is a key parameter in evaluating a PFC's overall performance. Power factor of PFCs operating at low load conditions has become more important recently, as PFCs may now work at low load conditions for most of the operation time. Also, power factor of PFCs operating with multiple mains voltage levels is always important, as mains voltage may have large variation between countries. Other power factor correctors in the prior art controlled the switch-on time of a control switch used in the SMPS, with the switch-on time maintaining a constant period after the PFC stabilized.

As an example, a typical SMPS design in a PFC may use a boost converter placed after a bridge rectifier and filter. Due to the filter current after the bridge rectifier, the current at the output of bridge rectifier may not equal the current drawn by the boost converter. At low load or high mains voltage conditions, because the current drawn by the boost converter is smaller, the filter current after the bridge rectifier may become more dominant. The source AC current may therefore become more concentrated within a shorter period. The higher concentration accordingly may increase the rms value of the source AC current, and therefore, may decrease the power factor, as the two quantities are inversely proportional.

In view of the foregoing, there has been long-felt need in the AC/DC power converter industry to deliver power more efficiently at low load or high mains voltage conditions.

SUMMARY

The present embodiments provide, among other features and benefits, significant advances in the control of power conversion, obtaining high power factor at low loads. A brief summary of various illustrative example embodiments is presented. Some simplifications and omissions may be made in the following summary, which is intended to highlight and introduce some aspects of the various example embodiments, but not to limit the scope of the invention. Detailed descriptions of preferred example embodiments adequate to allow those of ordinary skill in the art to make and use the inventive concepts will follow in later sections.

Various embodiments relate to methods of controlling power delivered from the main source to a load by an power factor corrector having a bridge rectifier and a SMPS which may be a boost converter having a core inductor connected through a diode to a capacitor and an inductor current control switch that is switchable between an ON and an OFF state and conducts only during the ON state, for controlling a current through the core inductor, controlling a current delivered to the load. The power factor corrector receives a mains alternating-current (AC) voltage as an input, wherein the mains AC voltage has an absolute voltage value varying in a cyclic manner from a zero to a zero over a cycle period. The cycle period has a first half-cycle period during which the absolute voltage value increases from the zero to a maximum, and a second half-cycle period during which the absolute voltage value decreases from the maximum to the zero.

According to various embodiments, the current control switch generates a series of conversion cycles in a timed manner relative to the cycle period, each conversion cycle including a duration $T_{on}$ during which the current control switch is ON and a duration $T_{off}$ during which the current control switch is OFF. At steady-state of PFC, delivery of current is higher during the second half-cycle period, so that the average current of core inductor during the second half-cycle period is greater than the average current of core inductor during the first half-cycle period.

Among features and benefits provided by the various embodiments, this time domain shift of current delivery to the load provides substantially improved power factor for the PFC, especially at low load values or high mains AC voltage.

According to one aspect, the operation of current control switch shifts delivery of current to the second half-cycle period by increasing $T_{on}$ over the cycle period to have an average $T_{on}$ length during the second half-cycle period that is substantially longer than the average $T_{on}$ length during the first half-cycle period. The average current of the core inductor within the second half-cycle period is thereby controlled to be substantially larger than that within the first half-cycle period.

According to another aspect of one or more example embodiments, the current control switch shifts delivery of current to the second half-cycle period by generating the series of conversion cycles only within a shifted time window, extending over the second half-cycle period substantially longer than extending over the first half-cycle period.

According to one aspect having, in one or more various example embodiments, a current control switch generates conversion cycles only during a shifted time window, the value $T_{on}$ may be constant for the conversion cycles, wherein the shifted time window alone, by effecting a substantially larger number of the conversion cycles during the second half-cycle period than the first half-cycle period, provides an average current of the core inductor within the second half-cycle period substantially larger than that within the first half-cycle period.

According to another aspect having, in one or more various example embodiments, a current control switch generates conversion cycles only during a shifted time window, the value $T_{on}$ may increase over the time window, to thereby provide an average current of the core inductor within the second half-cycle period substantially larger than that within the first half-cycle period by, in combination, effecting a substantially longer time for power conversion during the second half-cycle period than the first half-cycle period and, effecting a longer average $T_{on}$ for conversion cycles within the second half-cycle than for conversion cycles during the first half-cycle period.

Various embodiments relate to a circuit to control power delivered to a load by an AC/DC power converter, the AC/DC power converter receiving a mains alternating current (AC) voltage as an input, the mains AC voltage having a mains voltage cycle of an absolute voltage value varying in a cyclic manner from a zero to a zero over a cycle period, the cycle period having a first half-cycle period during which the absolute voltage value increases from the zero to a maximum, and a second half-cycle period during which the absolute voltage value decreases from the maximum to the zero. The circuit may comprise a rectifier to receive the mains AC voltage and produce a direct-current (DC) voltage a switched mode power supply (SMPS) to receive the DC voltage, produce an output voltage, and provide the output voltage and a drive current to the load, the SMPS including a control switch, being switchable between an ON and an OFF state and only conducting during said ON state, to control the output voltage and drive current delivered to the load, a filter that receives a filter current, and a feedback control circuit to drive the control switch between the ON and OFF states, wherein the feedback control circuit shifts the drive current relative to the mains voltage cycle by generating a error signal based on a difference between a reference mains current signal and a sensed current signal at the output of the rectifier, and modifying the drive current based on the error signal so that the reference mains current signal and the sensed current signal have an approximately equal current shape.

BRIEF DESCRIPTION OF THE DRAWINGS

In order to facilitate better understanding of various example embodiments, reference is made to the accompanying drawings, wherein.

DETAILED DESCRIPTION

Figure 1:
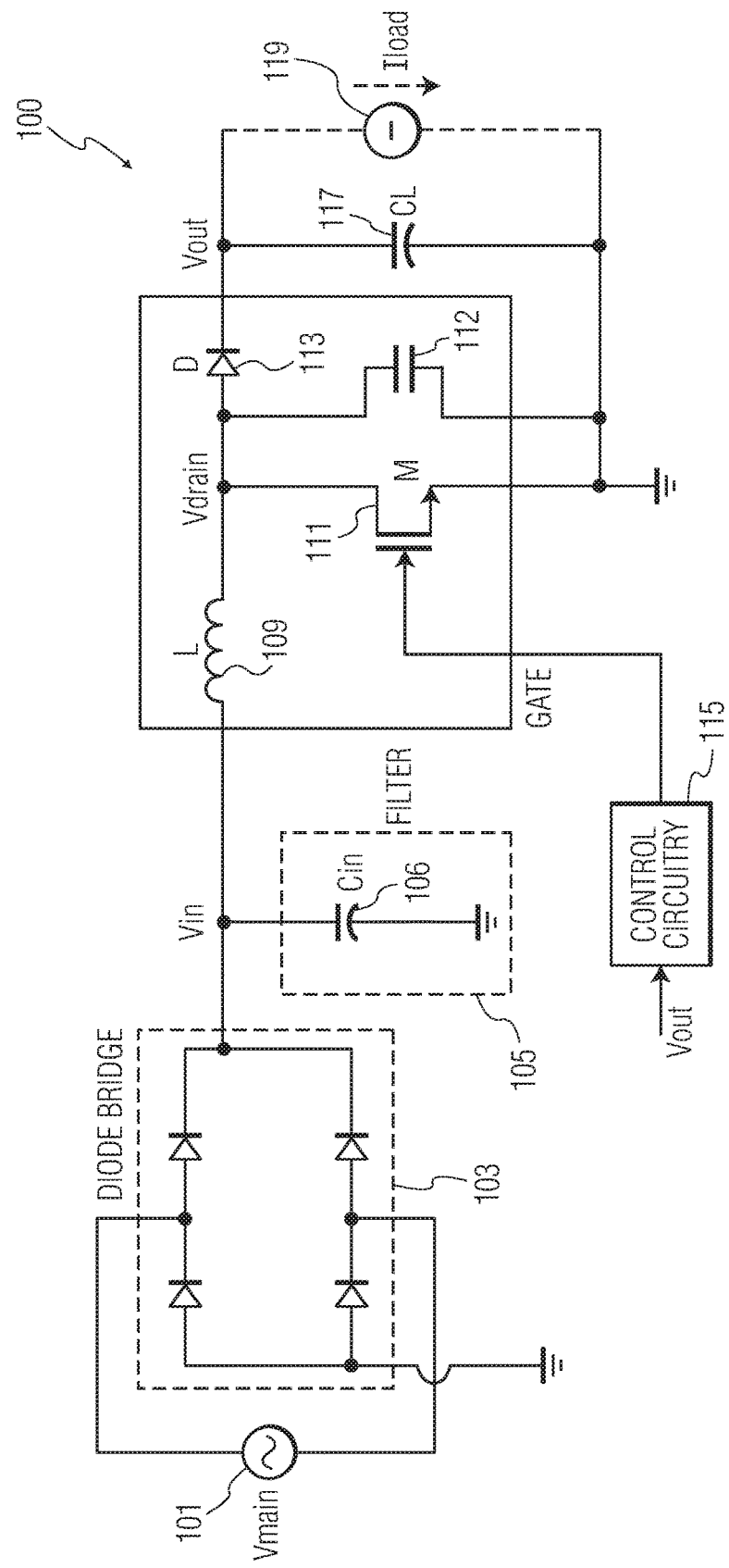
FIG. 1 is a schematic diagram of an example power factor corrector.

Referring now to the drawings, in which like numerals refer to like components or steps, there are disclosed broad aspects of various example embodiments.

FIG. 1 illustrates an example AC/DC power converter 100 as one example implementation of one power factor corrector according to one example embodiment. Power converter 100 may connect to an AC power source 101, and may include a bridge rectifier 103, a filter 105, a capacitor 106, and a boost converter 107 comprising an inductor 109, control switch 111, ringing capacitor 112, and diode 113. The example power converter 100 also includes control circuitry for control switch 115, load capacitor 117, which attaches to load 119. During regular operation the bridge rectifier 103 may convert the mains AC voltage from power source 101 into a rectified voltage, the noise in this voltage may be reduced by filter 105 before this voltage is delivered to boost converter 107. As will be described in greater detail at later sections, the control circuitry 115 controls, in various particular described manners that relate to the periodic cycle of the mains AC voltage and the load 119, the opening and closing of control switch 111. As will also be described in greater detail, the current in inductor 109 increases when the switch is in its ON-state (i.e., the switch is closed) and power is only delivered to the load 119 when the switch is in its OFF-state (i.e., the switch is open).

AC power source 101 may be a general-purpose alternating current electric power supply. AC power source may deliver a mains AC voltage, which may vary by country and may be profiled by a specified voltage, frequency, plugs, and sockets. In the example embodiment, AC power source 101 may deliver mains AC voltage characterized by a sine wave in the form of A sin (wt), where A is the amplitude of the mains AC voltage, w is the frequency of the wave, and t is time. Through bridge rectifier 103, mains AC voltage may be delivered during the entire cycle of one sine wave, which is referred to hereinafter as "the mains cycle."

Referring to FIG. 1, in the depicted example 100, bridge rectifier 103 may comprise two series of diodes (not separately numbered) connected in parallel, which may convert the mains AC voltage from AC power source 101 to an example rectified voltage, $V_{in}$. The output of the bridge rectifier 103 may be approximately characterized as |A sin(wt)|, as $V_{in}$ may be approximately characterized as the absolute value of the mains AC voltage. The configuration of the bridge rectifier 103 is not particular to the embodiments, and is not the only means for converting the mains AC voltage to a rectified voltage. A person of ordinary skill, in view of this disclosure, will recognize equivalent components to convert the mains AC voltage to a rectified voltage. With continuing reference to FIG. 1, filter 105 may be connected to the output of bridge rectifier 103 to reduce the noise. Filter 105 is characterized in the illustrative embodiment as a capacitor 106. A person of ordinary skill will recognize equivalent components to serve as a filter.

Continuing to refer to FIG. 1, the boost converter 107 in the depicted example 100 according to one embodiment may comprise inductor 109, control switch 111 controlled by control circuitry 115, ringing capacitor 112, and diode 113. Boost converter may also include load capacitor 117. In the illustrative embodiment, control switch 111 may be a JFET. A person of ordinary skill will recognize switches alternate to a JFET and, based on the present disclosure would understand how to reconfigure the power converter for their use. Boost converter 107 may receive the voltage produced by filter 105 $V_{in}$ and produce an output voltage $V_{out}$, which may be delivered to load 119. Boost converter 107 may be selected or configured to comply with standardized voltage conventions such as, for example, standard conventions for telecommunications devices, computer power supplies, or standard lighting sources. Boost converter 107 is merely an example implementation; a person of skill in the art knows of other SMPS topologies to produce the same effect, such as, for example, a flyback converter.

Control circuitry 115 controls the functioning of boost converter 107 by controlling the conducting time of control switch 111 in each conversion cycle. The conversion cycle may include the switch-on time $T_{on}$, the time control switch is closed, and switch-off time $T_{off}$, the time the switch is open. During $T_{on}$, the current of inductor 109 is increasing, and the diode 113 is not conducting. During $T_{off}$, for the continuous conducting mode (CCM) operation, the current of inductor 109 is decreasing, and the diode 113 is conducting. For the boundary condition mode (BCM) operation, when the control switch is off, the current of inductor 109 will first decreasing, and the diode 113 is first conducting. Then, when the current of inductor 109 achieves zero, the diode 113 will stop conducting, and both the voltage Vdrain and the current of inductor 109 will start oscillation due to the combination of inductor 109 and ringing capacitor 112. It will be understood that ringing capacitor 112 may be a parasitic capacitance in control switch 111 such as, for example, if control switch 111 is a field-effect-transistor (FET) a gate-to-drain capacitance of such a FET, or may be a discrete capacitor incorporated into the boost converter.

For consistent terminology in describing examples, the term "one conversion cycle," in relation to the control switch 111, will be used to refer to the sum of one switch-on time $T_{on}$ and its succeeding switch-off time $T_{off}$. Assuming the voltage delivered to the load 119 remains the same, a conversion cycle with a larger $T_{on}$ time will deliver more power to the low load 119 than a conversion cycle with a smaller $T_{on}$ time, as the current of inductor 109 may be higher with larger $T_{on}$ time. A mains cycle preferably includes a large number of conversion cycles. For example, an example mains cycle may be 20 ms, whereas an example constant conversion cycle may be 10 μs, so that a single mains cycle may contain 2000 conversion cycles. During a single mains cycle, the conversion cycle of control switch 111 may increase, decrease, or remain constant.

Load 119 may be a standard electric device that may operate at low loads. This may include devices that operate in different modes, where one of the modes (e.g., a standby mode) has an operation point at low loads. Power converter 100 may be capable of operation both at low loads and at higher loads. Power converter 100 may also be capable of producing a high power factor at higher loads.

Figure 2:
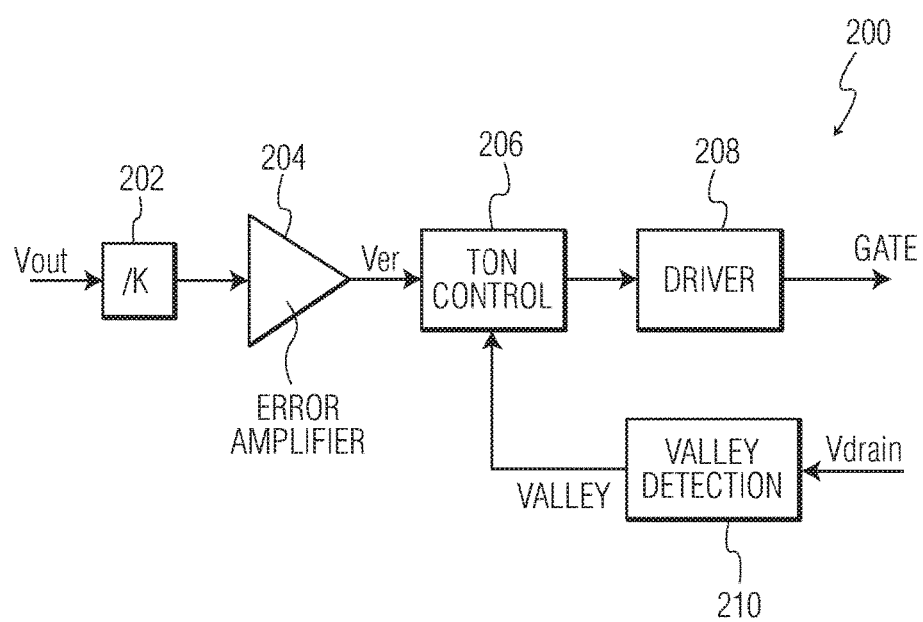
FIG. 2 is a block diagram of an example control circuitry in a power factor corrector.

Referring now to FIG. 2, a block diagram of an example control circuitry 115 is illustrated. Control circuitry 200 may include power divider 202, error amplifier 204, timer control circuit 206, driver 208, and valley-detection circuit 210. During regular operation, $V_{out}$ from boost converter 107 may first be divided at power divider 202 by a factor K, where K>1, to make $V_{out}$ easier to be processed by error amplifier, as will be understood by a person of ordinary skill in the art upon reading this disclosure. The resulting attenuated voltage signal $V_{out}/K$ may then be compared with a reference voltage $V_R$, and their difference is processed by error amplifier 204, whose output voltage, error voltage $V_{er}$ may be used to adjust switch-on time $T_{on}$.

Continuing to refer to FIG. 2, in boundary conduction mode operation, $V_{drain}$ may be sensed by valley-detection circuit 210 which may output an impulse to timer control circuit 206 when $V_{drain}$ achieves its minimum value (valley) during the oscillation time created by an LC circuit comprising inductor 109 and ringing capacitor 112. According to one example, valley detection circuit 206 detects when this minimum value (valley) is reached, produces an impulse and sends the impulse to the timer control circuit 206 that, in response, may trigger control switch 111 to turn on again.

As previously described, outputs of error amplifier 204 and valley-detection circuit 210 may be received by timer control circuit 206. Timer control circuit may, or may not have a current drive capacity sufficient to drive the control switch 111 and, if doe does not, the output of timer control circuit 206 may drive the driver 208 that, in turn, drives the control switch 111. In the illustrative embodiment, control circuitry 200 may receive $V_{out}$ from boost converter 106 and $V_{drain}$ corresponding to the drain voltage of control switch 111 to adjust the signal delivered to the gate of the same control switch 111. The shape of the signal to the switch may, for example, be a square wave.

Figure 3:
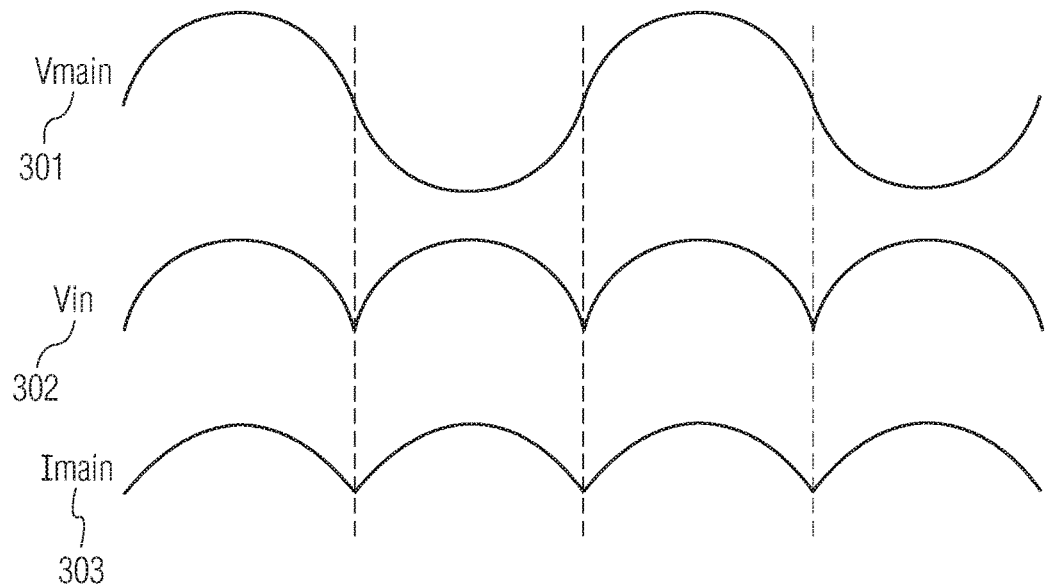
FIG. 3 is a timing diagram of the example power factor corrector at steady state.

Referring now to FIG. 3, a timing diagram of the power factor corrector at steady state is illustrated. The timing diagrams of the mains AC voltage 301, voltage delivered by the filter $V_{in}$ 302, and the absolute value of mains AC current 303 are illustrate at steady state of power factor corrector 100, if the current through filter 105 after the bridge rectifier 103 is neglected. Due to a constant switch-on time $T_{on}$ in the conversion cycle of the control switch 111, the mains AC current may exhibit a similar shape to the mains voltage. The absolute value of mains AC current 303 may therefore illustrate an ideal power factor for power factor corrector 100.

Figure 4:
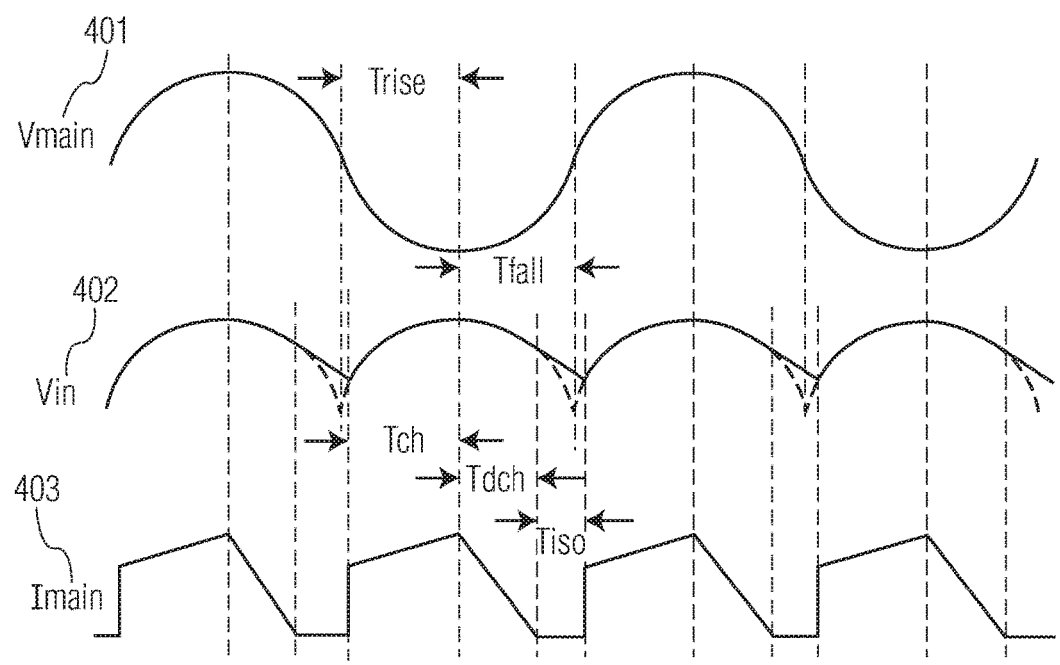
FIG. 4 is another timing diagram of the example power factor corrector at steady state.

However, if the current of filter 105 after bridge rectifier 103 is considered, each cycle of $V_{in}$ corresponding to the mains cycle may be divided into three phases. Referring now to FIG. 4, another timing diagram of an example power factor corrector is illustrated. Mains AC voltage 401 remains the same as mains AC voltage 301. The absolute value of mains AC voltage may be split into a rise time and a fall time. For filtered voltage $V_{in}$ 402, there may be three phases. During the first phase $T_{ch}$, the capacitor $C_{in}$ 106 may be charged by the mains power. The absolute value of mains AC current may therefore be the sum of the charge current of $C_{in}$ 106 and the current of inductor 109, and according to the equation:

$$|I_{main}| = I_{coil} + C_{in}\left|\frac{dV_{main}}{dt}\right|$$

Where $I_{main}$ is the mains AC current, $I_{coil}$ is the current of inductor 109, and $V_{main}$ is mains AC voltage 401. At the end of $T_{ch}$, filtered voltage $V_{in}$ 402 may achieve its maximum value, which may correspond to the maximum absolute value of mains AC voltage 401. During the second phase $T_{dch}$, capacitor $C_{in}$ 106 may discharge through the boost converter, where the absolute value of mains AC current may be equal to the difference between the current of inductor 109 and the discharge current of from capacitor $C_{in}$ 106, according to the equation:

$$|I_{main}| = I_{coil} - C_{in}\left|\frac{dV_{main}}{dt}\right|$$

At the end of the second phase $T_{dch}$, the current of inductor 109 may be equal to the discharge current from capacitor 106 that is equal to $C_{in}|dV_{main}/dt|$, Thereafter, during the third phase $T_{iso}$, the current of inductor 109 may be smaller than the required discharge current $C_{in}|dV_{main}/dt|$ to sustain the conducting of bridge rectifier, and therefore, filter 105 after bridge rectifier 103 may be isolated from AC power source 101 by bridge rectifier 103. As a result, there may be no current through the mains, and the discharge current of filter 105 may be equal to the current of inductor 109. Therefore, with a constant switch-on time $T_{on}$ for the conversion cycles of control switch 111, the voltage on filter 105 $V_{in}$ may decrease during phase $T_{on}$ with, for example, an exponential function. In some embodiments, filter voltage 105 $V_{in}$ may decrease with an exponential function close to a linear function during phase $T_{iso}$.

Due to a control loop formed in power factor corrector 100, the coil current from inductor 109 may be proportional to the load current at steady state. As a result, with a high load current, the current of filter 105 may be neglected compared to the current of inductor 109. This means that the mains AC current may therefore exhibit approximately the same shape as the mains AC voltage. The current of filter 105 therefore may have negligible effect on the power factor at high load currents. However, with low load currents, the resulting low current of inductor 109 may make the current of filter 105 non-negligible. In this case, the mains AC current during phase $T_{ch}$ may be much larger than that during phases $T_{dch}$ and $T_{iso}$. During each cycle of $V_{in}$, a lower load current may lead to shorter $T_{dch}$ and $T_{ch}$ phases and a longer $T_{iso}$ phase. In such embodiments, the mains AC current may be concentrated in the $T_{rise}$ period of mains AC voltage 401. This may result in a higher $I_{rms}$ of mains AC current compared to when mains current is more evenly distributed throughout the half mains cycle.

If the amplitude of mains AC voltage is high, the current of inductor 109 may be low, as power delivered from mains AC voltage source 101 may be equal to the power delivered to the load. The current of filter 105 may therefore be more dominant. This may result in the mains AC current becoming more concentrated. The current of filter 105 itself may be consequently be larger ($C_{in}|dV_{main}/dt|$) when the mains AC voltage is high. The higher filter current may also make the mains AC current more concentrated, which may result in a higher $I_{rms}$ of mains AC current compared to when mains current is more evenly distributed throughout the half mains cycle. This follows the equation for power factor in power factor corrector 100, which is:

$$PF = \frac{P_{real}}{V_{rms}I_{rms}}$$

Where $P_{real}$ is the real power drawn from the main source, $V_{rms}$ and $I_{rms}$ are the root mean squared (rms) voltage and root means squared current of the mains. Accordingly, the power factor may become lower with low load current or with high mains AC voltage due to the decreased ratio between the power drawn from the main source and the rms mains AC current.

According to an example embodiment, the power factor may be increased at low load current or high mains AC voltage conditions by applying different currents of inductor 109 in different time intervals. A control circuitry 115 in power factor corrector 100 may make the average current of inductor 109 during the falling time of the absolute value of the mains AC voltage $I_{avg,f}$ larger than the average current of inductor 109 during the rising time of the absolute value of the mains AC voltage $I_{avg,r}$. In such an embodiment, the mains AC currents during time intervals $T_{rise}$ and $T_{fall}$ may be more symmetrical to each other. Due to larger current in the inductor $I_{avg,f}$ during $T_{fall}$, the time interval without any mains AC current, $T_{iso}$, may also be shorter and therefore, mains AC current may be more widely distributed in each half mains cycle, which may reduce $I_{rms}$ and may therefore increase the power factor of power factor corrector 100.

Figure 5:
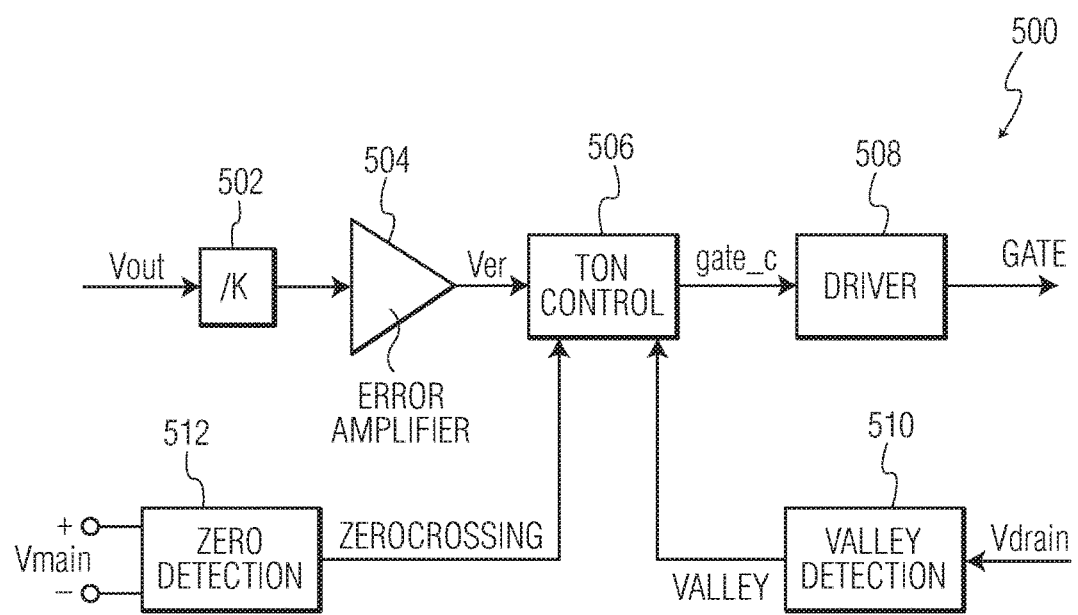
FIG. 5 is a block diagram of another example control circuitry in a power factor corrector.

Referring now to FIG. 5, a block diagram of another example control circuitry 500 according to one embodiment is illustrated. In this example 500 of the one embodiment, switch-on time $T_{on}$ of the control switch 111 conversion cycle increases from a zero-crossing point in the mains cycle, the moment that mains AC voltage 401 is zero, to the next zero-crossing point in the mains cycle. In some embodiments, switch-on time may increase from the moment near the zero-crossing point in the mains cycle to the moment near the next zero-crossing point in the mains cycle. Similar to the example control circuitry 200 in FIG. 2, with devices 502-510 matching the functionality of devices 202-210, control circuitry 500 adds zero-detection block 512, which detects the zero-crossing points of the mains cycle and outputs a zero-crossing signal in the form of a square wave to timer control circuit 506.

Figure 6A:
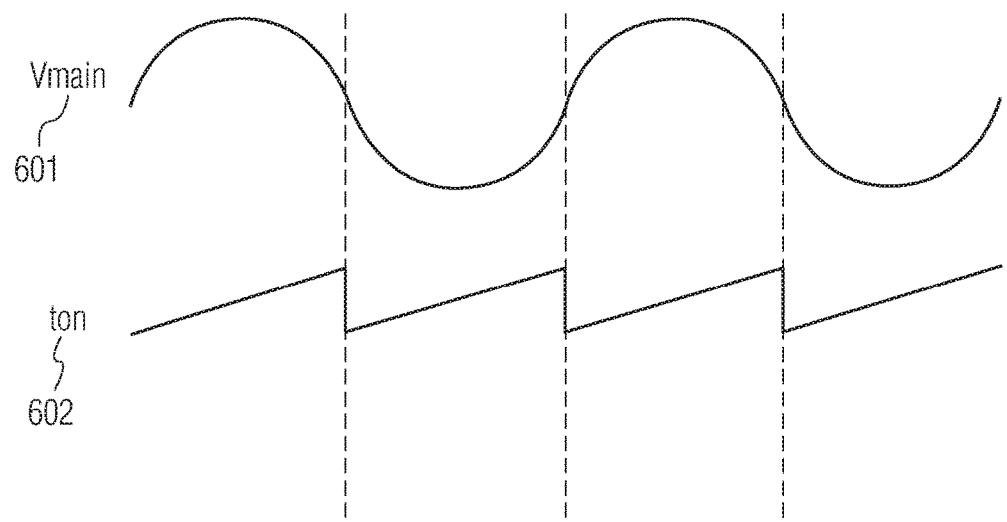
FIG. 6A is a timing diagram of the example power factor corrector.
Figure 6B:
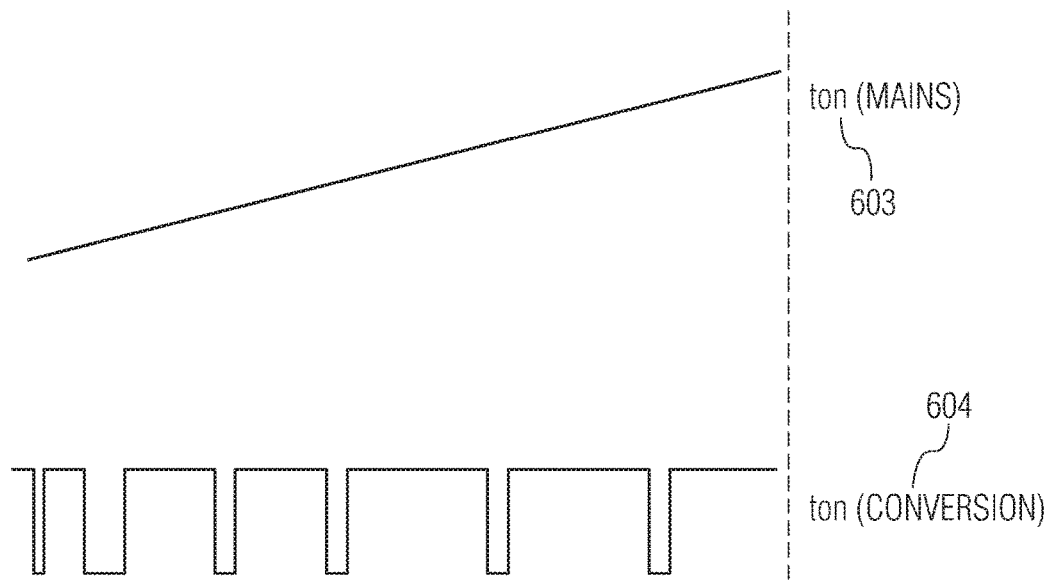
FIG. 6B is another timing diagram of the example power factor corrector.

Referring now to FIG. 6A, a timing diagram of another example power factor corrector is illustrated. With mains AC voltage 601 equivalent to mains AC voltage 301, 401, switch-on time $T_{on}$ 602 of the conversion cycle of control switch 111 may be increased linearly during a single mains half cycle period from one zero-crossing point in the mains cycle to the next zero-crossing point in the mains cycle. Referring now to FIG. 6B, a timing diagram of switch-on time $T_{on}$ during a single mains half cycle period is illustrated. When switch-on time $T_{on}$ 603, increases during the mains half cycle period, control switch 111 remaining on for longer within a single conversion cycle than within the last conversion cycle.

Figure 7:
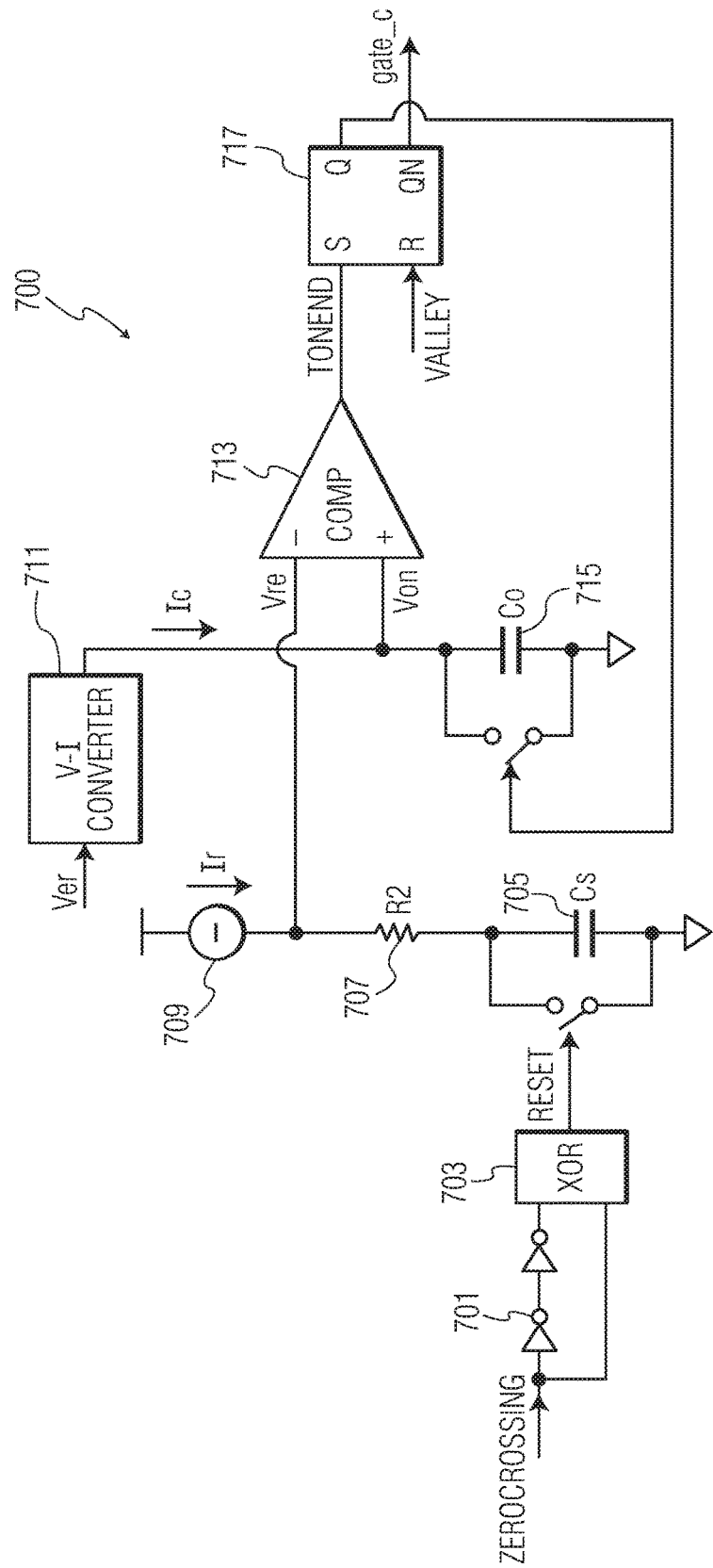
FIG. 7 is a schematic diagram of an example timing control circuit.

Referring now to FIG. 7, a schematic diagram showing one illustrative example implementation 700 of timer control circuit 506 is illustrated. The example timer control circuit 700 may include a series of inverters 701, an XOR gate 703, a first capacitor 705, a resistor 707, a current source 709, a voltage to current (V/I) converter 711, a comparator 713, a second capacitor 715, and an SR latch 717. During regular operation, timer control circuit 700 may receive a zero-crossing voltage (the output of zero detection circuit 512), an error-amplified voltage (the output of error amplifier 504), and a valley-detection voltage (the output of valley detection circuit 510) and provide a signal for the gate of control switch 111.

In an example embodiment, current source Ir 709 flows through resistor 707 and charges capacitor Cs 705 to generate a voltage Vre. Voltage Vre may linearly increase within each half mains cycle with a slope that may be used to define the slope of the switch-on time $T_{on}$. The slope of Vre may be linear. The zero-crossing signal received from zero-detection circuit 512 may be delayed with two inverters 701 before reaching XOR gate 703. XOR gate may receive the delayed signal and the zero-crossing signal without delay and may generate a reset signal, which may be used to control the charging and discharging of capacitor Cs 705. Resistor R2 707 is used to define the initial value of voltage Vre, and therefore, define the initial value of $T_{on}$. Error amplifier output signal Ver received from error amplifier 504 may generate a current Ic through V/I converter 711 that is proportional to Ver. Ic may be used to determine the average switch-on $T_{on}$ time for conversion cycles within each half mains cycle. Ic may charge second capacitor Co 715 to produce a voltage Von.

At the end of a switch-on time $T_{on}$, Von may be equal to Vre, and comparator 713, which receives Von and Vre, may output a signal (tonend) that may set SR latch 717 and result in a low output voltage (gate_c), which may turn off the control switch 111 via driver 508. SR latch may discharge capacitor Co with a parallel switch at the end of the switch-on time. When a minimum value of $V_{drain}$ during its oscillation time is detected at valley-detection circuit 510, valley-detection circuit 510 may produce a short impulse to signal valley, which may reset SR latch 717. Control switch 111 may then be turned on, and capacitor Co may start to be charged again by current Ic from V/I converter 711.

Figure 8:
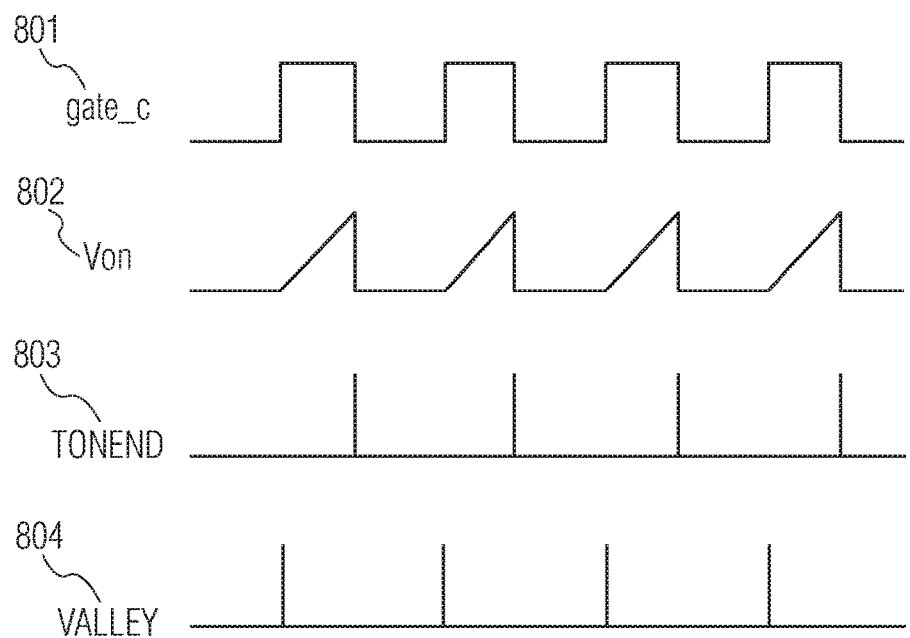
FIG. 8 is a timing diagram of the example timing control circuit.

Referring now to FIG. 8, a timing diagram of the example timer control circuit during multiple conversion cycles is illustrated. In FIG. 8, an impulse in valley-detection voltage 804 produced by valley-detection circuit 510 when the switch is off may trigger a reset of SR latch 717. The reset SR latch 717 may produce a positive gate_c signal 801 to drive control switch 111. The reset SR latch may also open a switch that may allow capacitor Co 715 to charge, which may produce a positive Von signal 802. Von will steadily increase as capacitor Co 715 is charged and gate_c may steadily send a constant positive signal in the form of a square wave until comparator 713 produces a tonend signal 803 that triggers SR latch 717, resulting in low outputs for the gate_c 801 and Von 802 signals.

Figure 9:
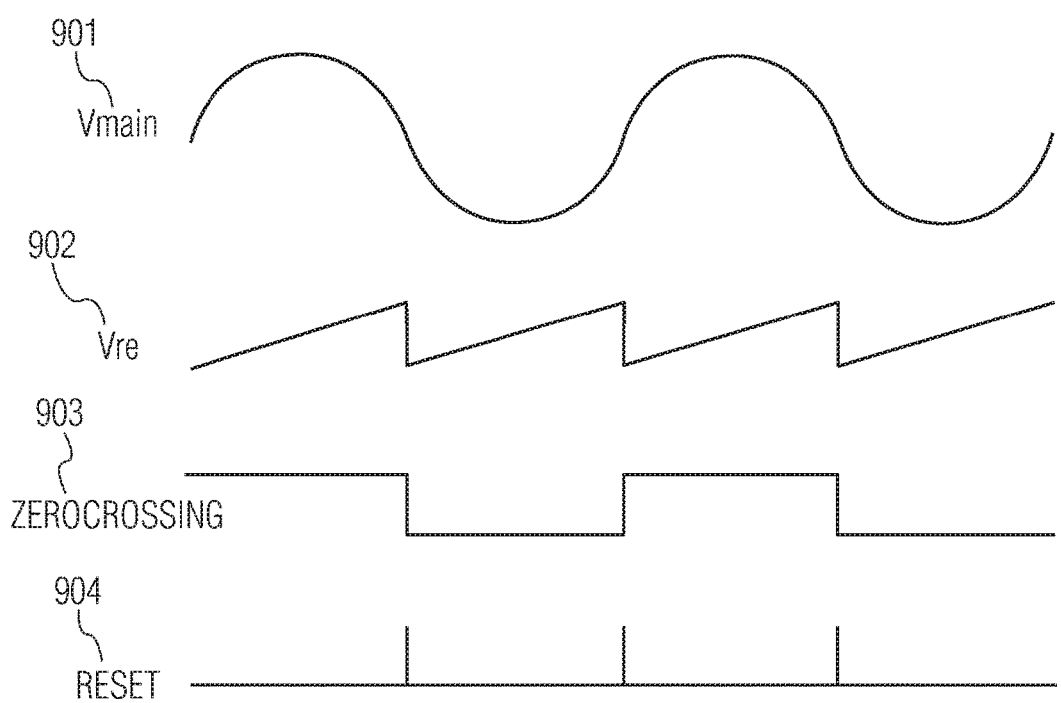
FIG. 9 is another timing diagram of the example timing control circuit.

Referring now to FIG. 9, a timing diagram of the example timer control circuit during multiple mains cycles is illustrated. Whenever zero-crossing signal 903 changes its logic value, which corresponds to a zero in mains signal 901, an impulse is produced in reset signal 904. This may result in discharging the first capacitor Cs 705, which may reset the Vre signal 902. Vre may steadily increase throughout a mains cycle as first capacitor Cs 705 is charged.

Figure 10:
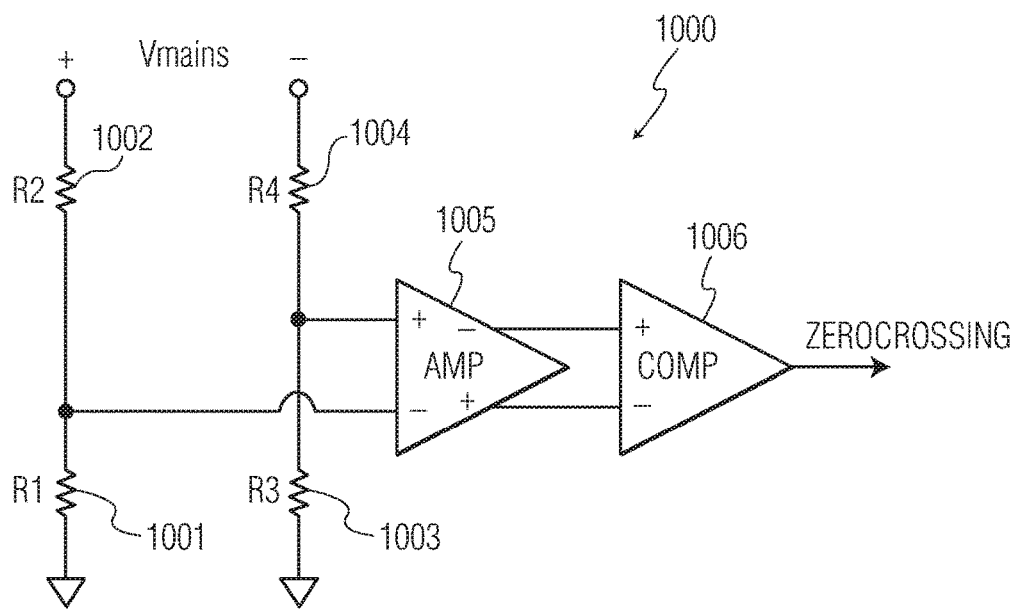
FIG. 10 is a schematic diagram of an example zero-detection circuit.

Referring now to FIG. 10, an example zero-detection circuit is illustrated. Zero-detection circuit 1000 may include four resistors 1001-1004, an amplifier 1005, and a comparator 1006. Amplifier 1005 may receive for a positive input the voltage from a first voltage divider (not separately numbered) consisting of, for example, resistor R2 1001 and R2 1002 and a negative input from a second voltage divider consisting of resistor R3 1003 and R4 1004. In some embodiments, R1=R3 and R2=R4. The first voltage divider may receive the positive terminal of mains AC voltage, while the second voltage divider may receive the negative terminal of mains AC voltage. Amplifier 1005 may then amplify its differential inputs. The output of amplifier 1005 may be connected to the input of comparator 1006, which may output a zero-crossing signal that changes logic value when the mains voltage is equal to zero.

Figure 11:
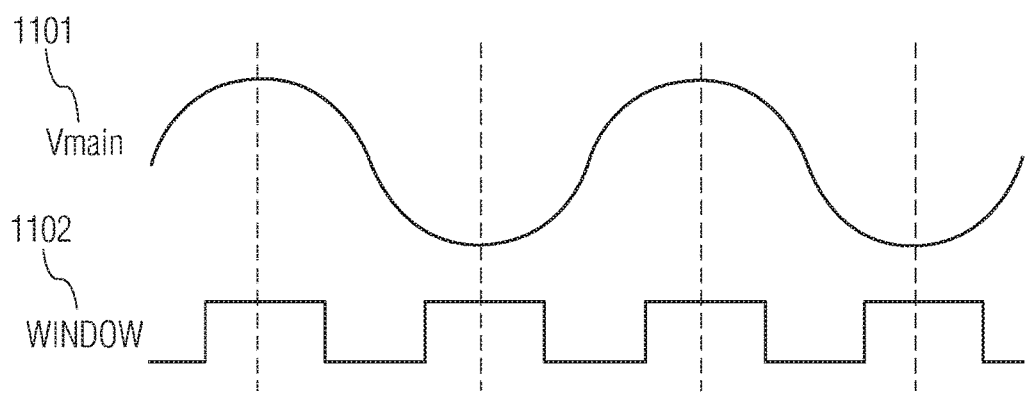
FIG. 11 is a timing diagram of another example power factor corrector.

Referring now to FIG. 11, a timing diagram of another example control circuitry 115 is illustrated. In the example embodiment, during the mains cycle, the switch-on time $T_{on}$ for the conversion cycle of control switch 111 may remain constant. In addition, power from AC power source 101 may only be delivered in a timing window 1102 that occurs once during a mains half cycle period. In the illustrative embodiment, timing window 1102 occurs both during the rising time and the falling time of mains AC voltage 1101. However, the middle point of timing window 1102 may occur within the falling time of the absolute value of the mains AC voltage, so that a majority of the timing window 1102 occurs during the falling time of the absolute value of the mains AC voltage 1101. In this embodiment, the average coil current from inverter 109 during falling period $T_{fall}$ may also be larger than the average coil current during rising period $T_{rise}$, as the total switch-on time $T_{on}$ for the control switch 111 conversion cycles is larger during $T_{fall}$ than that during $T_{rise}$ due to the unbalanced timing window 1102 in favor of $T_{fall}$.

Figure 12:
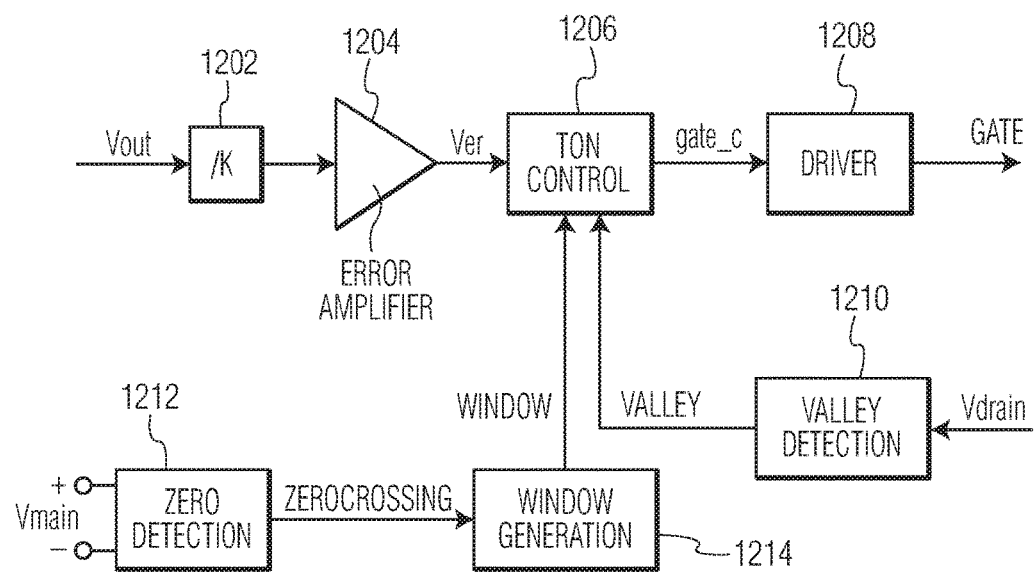
FIG. 12 is a block diagram other another control circuitry in a power factor corrector.

Referring now to FIG. 12, a block diagram of another example control circuitry 1200 is illustrated. The example depicted at FIG. 12 is similar to the block diagram of the example control circuitry depicted at FIG. 5. Components 1202-1212 of control circuitry 1200 may be similar in overall function to components 502-512 of the FIG. 5 control circuitry 500; however the timer control circuit 1206 may not have switch-on time $T_{on}$ increase during a half mains cycle. Instead control circuitry 1200 may have timer control circuit 1206 maintain a constant switch-on time $T_{on}$ and may add a window generation circuit 1214. The output of zero-detection circuit 1212 may now output into window generation block 1214, which may use the zero-crossing signal to generate the timing window 1102. The generated timing window 1102 by window generation circuit 1214 may be used to define the timing interval of the power conversion for power factor corrector 100. Control switch 111 may therefore only turn on within the timing window 1102. Outside the timing window 1102, switch-on time $T_{on}$ may always zero and therefore control switch 111 may be always turned off.

Figure 13:
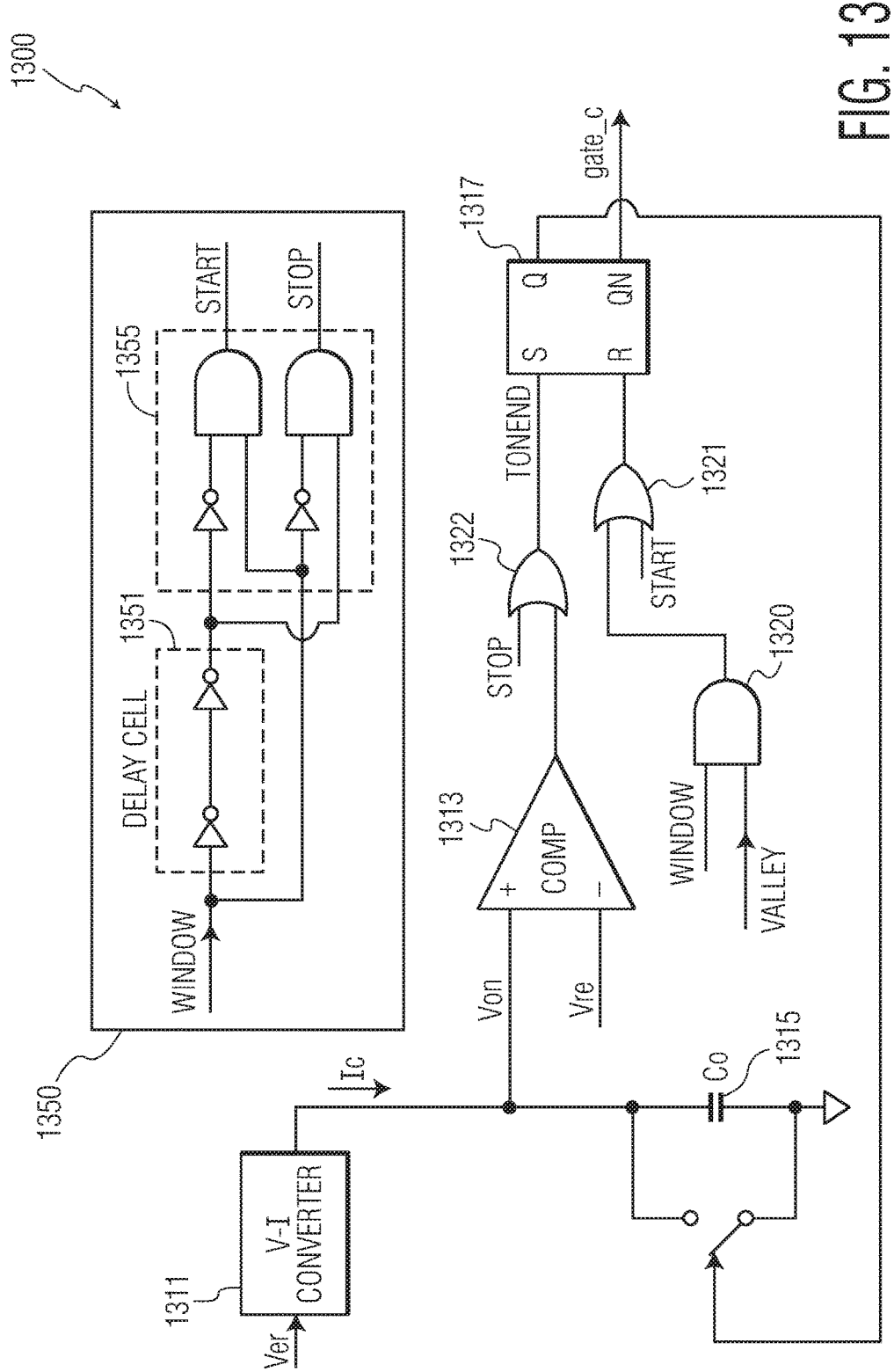
FIG. 13 is a schematic diagram of another example timer control circuit.

Referring now to FIG. 13, a schematic diagram of an example timer control circuit, labeled generally as 1300, is illustrated. Distinguished from the timer control circuit of FIG. 7, the timer control circuit 1300 does not contain components equivalent to 701-709 that determined signal Vre. Timer control circuit 1300 instead maintains a constant switch-on time $T_{on}$. Timer control circuit 1300 uses a reference voltage for Vre and adds a delay circuit 1350 that receives the windowing signal from windowing circuit 1214 and outputs start and stop signals to into SR latch 1317, which makes gate_c signal high at the beginning of a timing window and low at the end of a timing window. The delay circuit 1350 may consist of a delay cell 1351 of comprising a series of inverters that, with the windowing signal from windowing circuit 1214, produces a signal that inputs into combination circuit 1355 to generate short impulses. The delay circuit 1350 may produce a start impulse to start the power conversion and a short impulse (stop) to stop the power conversion within in each half mains cycle. The output of the start signal may be combined at OR gate 1321 with the AND gate 1320 output of the windowing signal from windowing circuit 1214 and valley signal from valley-detection circuit 1210. The output of the stop signal may be combined at OR gate 1322 with the output of comparator 1313 to produce the tonend signal. Within each timing window 1102, switch-on time $T_{on}$ may be defined by the charging time of capacitor Co 1315. Switch-on time of control switch 111 may therefore be determined by the current Ic that charges capacitor Co 1315 to a reference level Vre and is made proportional to the error amplifier 1204 output Ver by V/I converter 1311.

Figure 14:
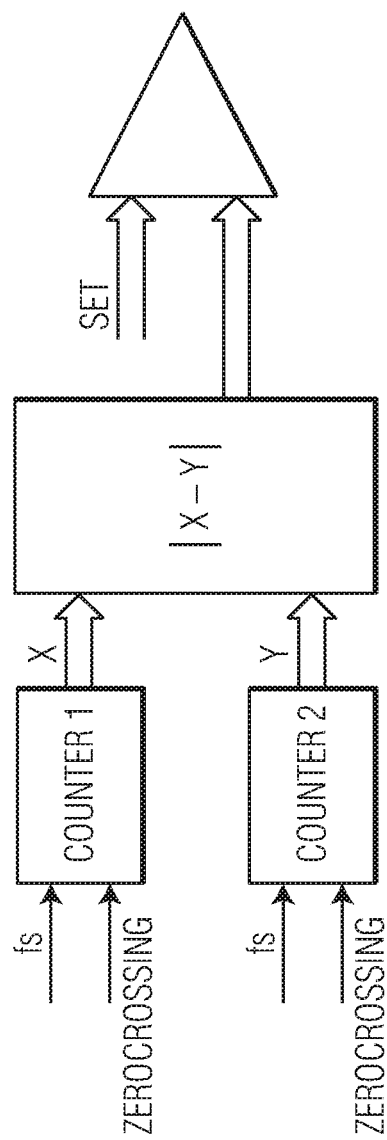
FIG. 14 is a schematic diagram of an example window generation circuit.

Referring now to FIG. 14, a schematic diagram of a window generation circuit, labeled generally as 1400, is illustrated. Windowing circuit 1400 may include first and second counters 1401, 1402, combination circuit 1403, and comparator 1404. Both counters 1401, 1402, may be up- and-down counters. Both counters 1401, 1402 may work with a synchronous clock (not shown). During a mains cycle, one of the two counters, for example first counter 1401, may count up, while the other counter, for example second counter 1402, may simultaneously count down. In some embodiments, the counter that counts up in the last half mains cycle may first keep data constant from the zero-crossing point for some synchronous clock cycles, then proceed to count down until the next zero-crossing point. In addition, the counter that counts down in the last half mains cycle may first reset the output data to zero at the zero-crossing point, then start counting up until the next zero-crossing point. Combination circuit 1403 may then calculate and output the absolute value of the difference between the two counters output data. The output of combination circuit 1403 may then be compared with a defined digital data, such as for example, a set signal, with comparator 1404 that may output a desired timing window signal.

Figure 15:
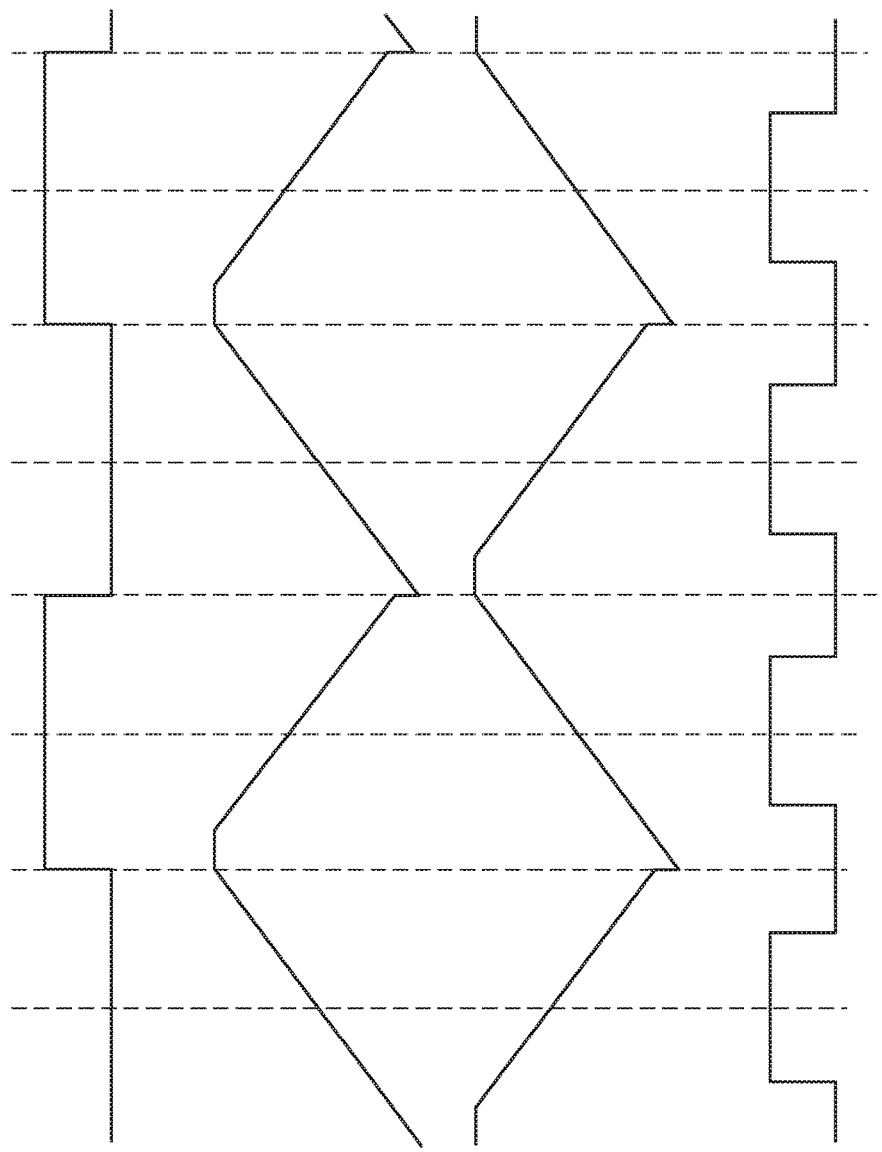
FIG. 15 is a timing diagram of the example window generation circuit.

Referring now to FIG. 15, a timing diagram of an example window generation circuit, generally labeled as 1500, is illustrated. As seen when zero-crossing signal of the mains cycle period 1501 changes from zero to one (while the timing window 1504 remains constant), the output 1502 of the first counter 1401 that was counting up first keeps the data constant for a time and then counts down. Conversely, the output 1503 of second counter 1402 that was counting down immediately resets to zero and begins to count up.

Figure 16:
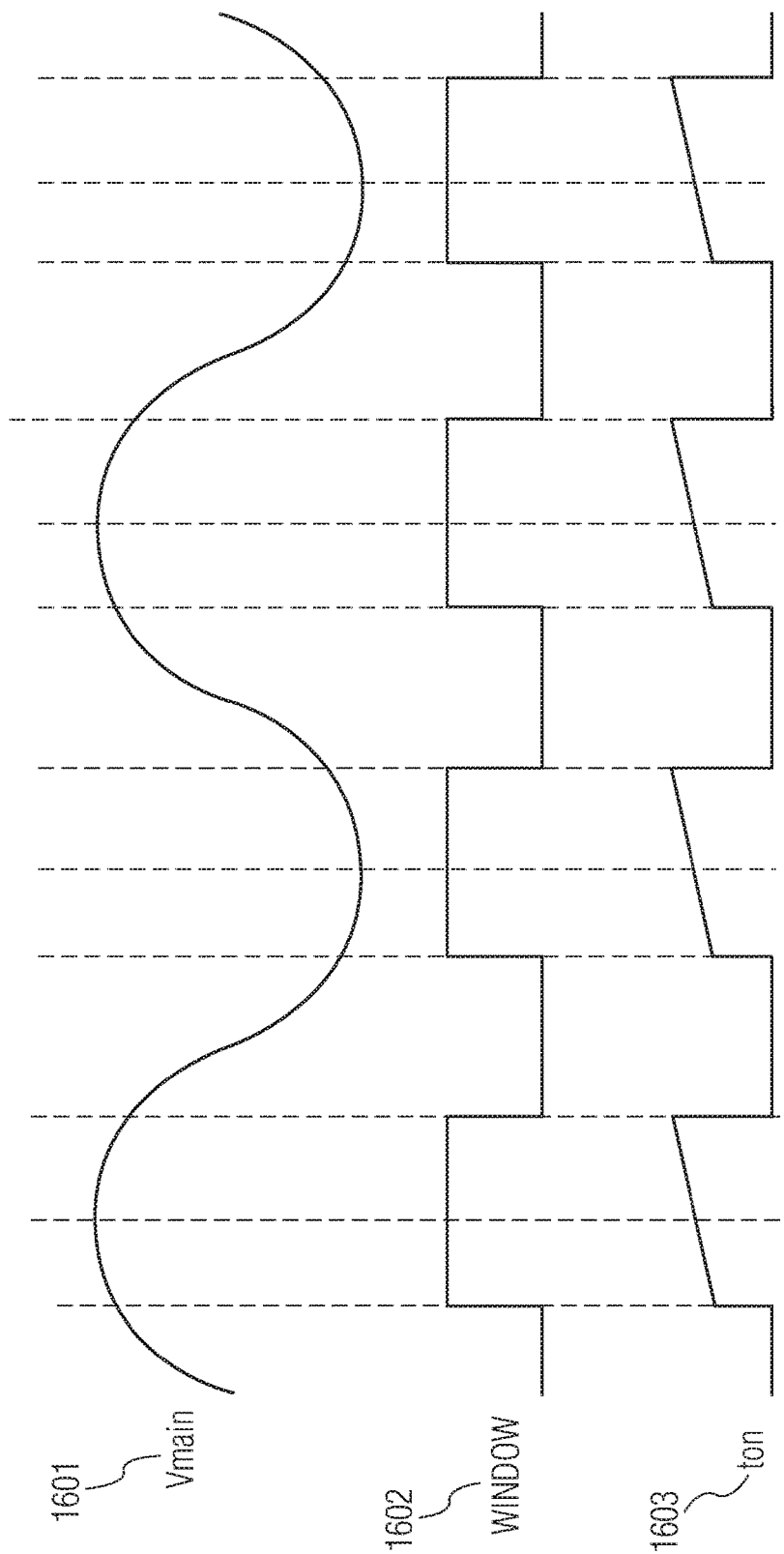
FIG. 16 is a timing diagram of another example power factor corrector.

Referring now to FIG. 16, a timing diagram for another example power factor corrector is illustrated. In the example embodiment, power may be delivered only in a periodic timing window 1602 whose middle point occurs during a moment in the falling time of the absolute value of the mains AC voltage 1601. In the example embodiment, switch-on-time $T_{on}$ 1603 of the conversion cycle of control switch 111 will also increase from the within the timing window 1602.

Figure 17:
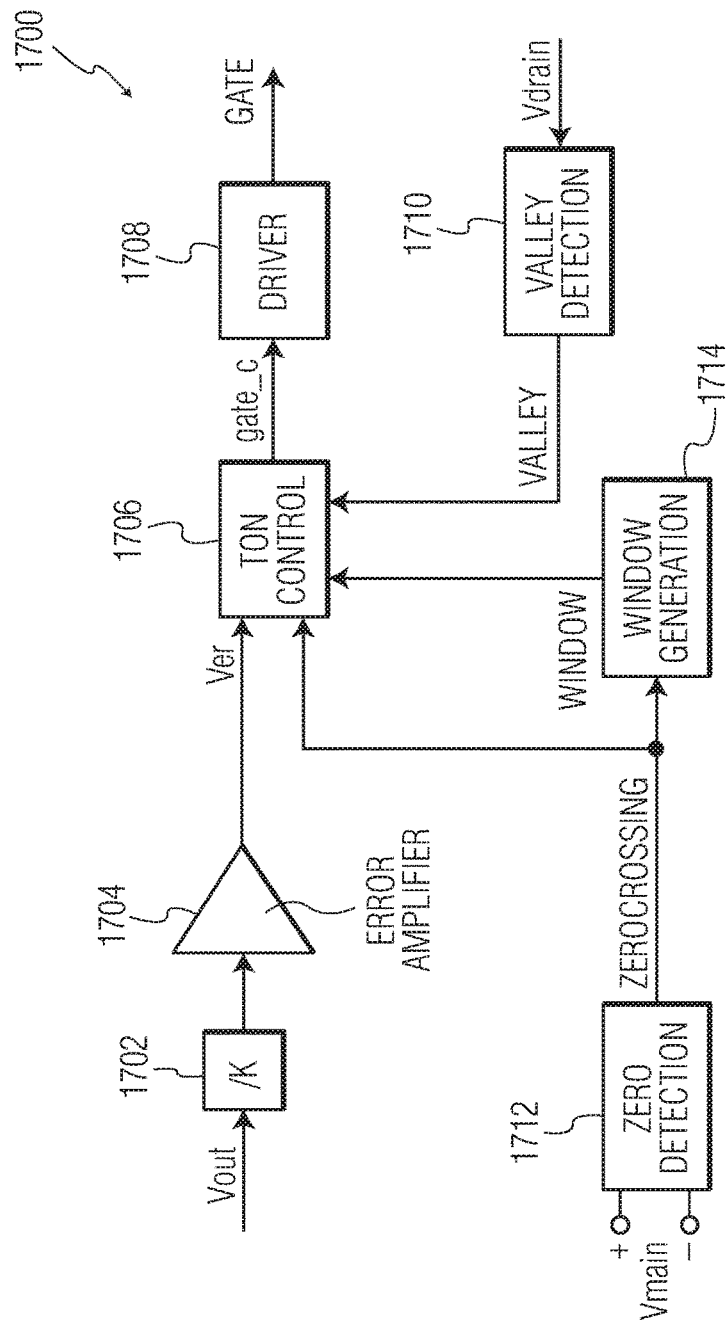
FIG. 17 is a block diagram of another example control circuitry in a power factor corrector.

Referring now to FIG. 17, a block diagram of another example power factor corrector, generally labeled as 1700, is illustrated. Similar to the power factor corrector 1200, with components 1702-1714 corresponding to components 1202-1214, the zero-crossing signal generated from zero-detection circuit 1712 is outputted to both timer control circuit 1706 and window generation circuit 1714.

Figure 18:
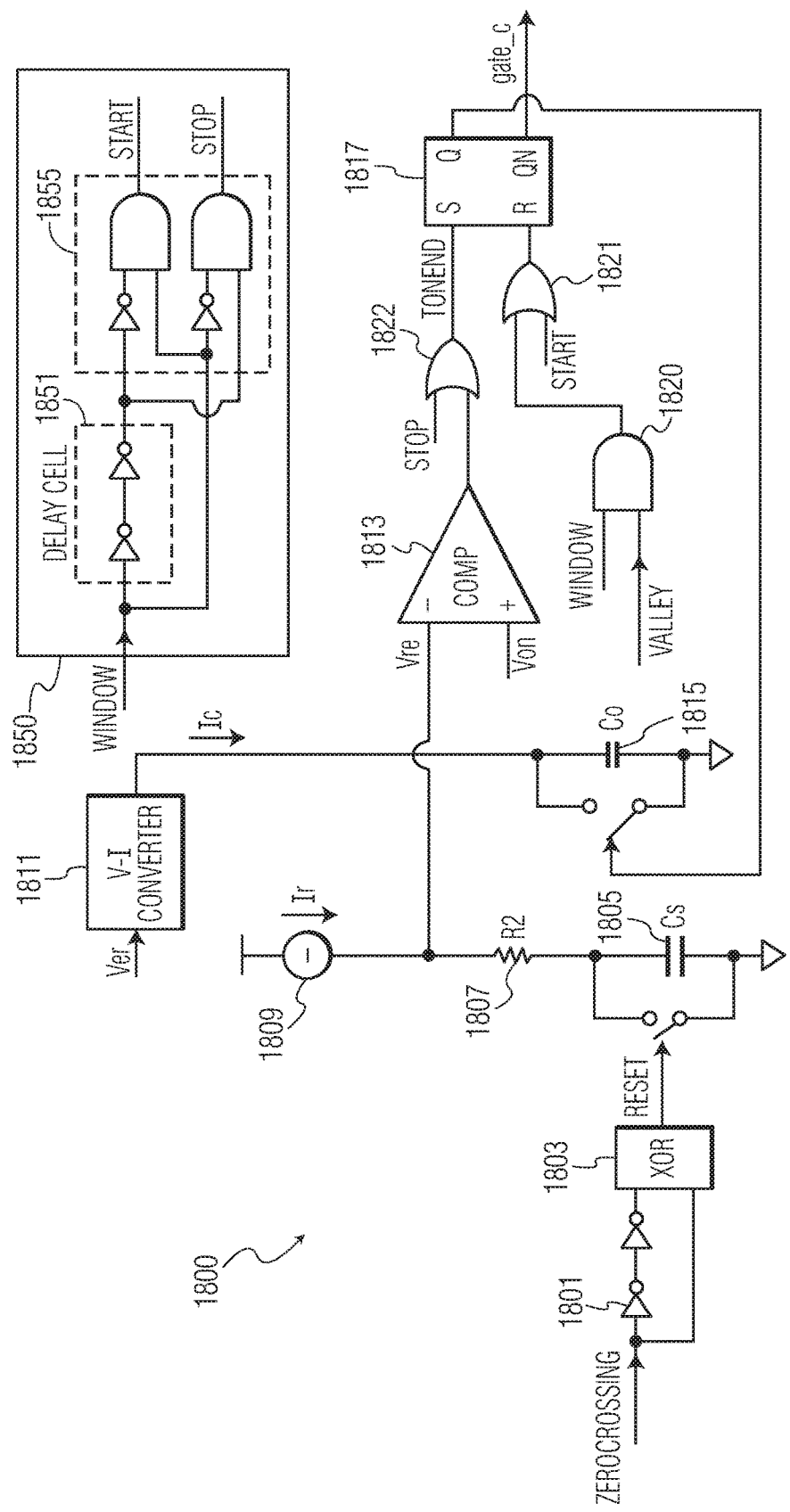
FIG. 18 is a schematic diagram of another example timer control circuit.

Referring now to FIG. 18, a schematic diagram of another example timer control circuit, generally labeled as 1800, is illustrated as an example of implementation of 1706. Similar to the timer control circuits of FIGS. 7 and 13, components 1801-1822 and 1850-1855 in timer control circuit 1800 correspond to like-named components in timer control circuits 700 and 1200, respectively. In this embodiment, Vre is not a reference voltage; rather Vre is generated from components 1801-1809 in a similar manner to voltage Vre generated from components 701-709 in FIG. 7.

Figure 19:
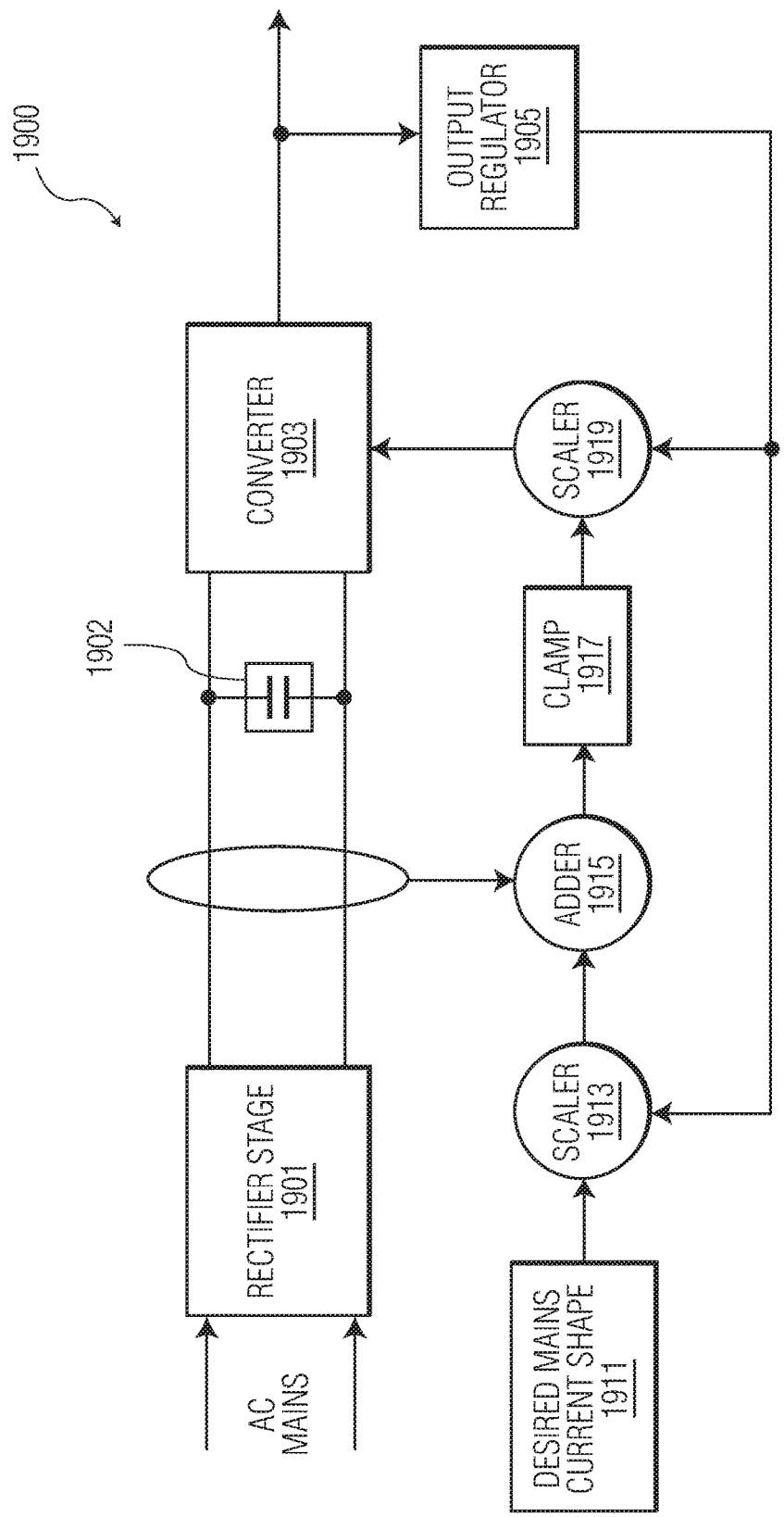
FIG. 19 is a schematic diagram of an example feedback power control circuit.

FIG. 19 is a schematic diagram of an example feedback power control circuit 1900 as one example implementation of another power factor corrector to one example embodiment. Similar to the power converter 100, the feedback power control circuit 1900 includes a rectifier stage 1901, a filter stage 1902 comprising a capacitor ($C_{in}$), and a converter stage 1903. Feedback power control circuit 1900 may connect to an AC power source, receiving an AC mains power, while producing an output power from the converter 1903. Feedback power control circuit 1900 also may include a feedback system for the converter 1903 similar to the control circuitry 115 for the control switch 111. The feedback stage may comprise a desired mains shape block 1911, a scaler 1913, an adder 1915, a clamp 1917, along with an output regulator block 1905 and another scaler 1919.

In the illustrative embodiment, the feedback system may compensate for the current of the filter stage 1902 by drawing a current opposite the current drawn by the filter. This may be done by the feedback system determining an error based on the difference between a desired mains current shape and a sensed mains current shape. The feedback system may then scale a power level signal that is related to the output power by the error to produce a control input for the control switch of the converter 1903. The feedback system may also be limited to a specific range of error signals in order to increase the efficiency of the feedback power control circuit 1900.

Rectifier stage 1901 may be similar to the bridge rectifier 103 and may convert an AC mains voltage to a rectified voltage ($V_{in}$). The rectified voltage produced by the rectifier stage 1901 may be, for example, a sinusoidal voltage. In embodiments where the filter 1902 is not included, the rectifier stage 1901 may be connected directly with the converter 1903, where the converter 1903 may draw a current ($I_{in}$) proportional to the rectified voltage. In such instances, the feedback system may not produce an error signal (i.e., $I_{error}=0$); this may occur when the desired mains current shape 1911 and the sensed input current shape have the same amplitude at the adder 1915. When the error value is equal to zero, the scaler 1919 may produce a control input equal to the power level setting signal produced by the output regulator block 1905. When the control input is approximately equal to the power level setting signal, the control output may, in some embodiments, cause the control switch in the converter 1903 to have a constant switch-on time $T_{on}$ when the converter 1903 comprises a boost converter. In other embodiments, the input control may comprise a different signal or parameter when the converter 1903 comprises a different component. For example, the input control may be a parameter to program the converter 1903 when it comprises a converter stage that behaves like a programmable resistor. When the converter 1903 has a constant switch-on time, the converter 1903 may act similar to an ideal resistor, producing an input current proportional to the input voltage.

Filter 1902 may be connected to the output of the rectifier stage 1901 and may comprise, for example, a capacitor $C_{in}$ that may receive a current from the output of the rectifier stage 1901. In the illustrative embodiment, for example, the filter 1902 may receive a non-negligible current $I_{cap}$ when reducing the noise from the rectifier stage 1901. As a result, the current from the rectifier $I_{mains\_rect}$ may be approximately equal to the sum of the current through the filter $I_{cap}$ and the current received by the converter $I_{conv}$. In some embodiments, the feedback system may control the operation of the converter 1903 to compensate for the capacitive current.

Converter 1903 may comprise one or more components that receives a current from the rectifier stage 1901 and produces an output based on the received current. For example, the converter 1903 may be similar to the boost converter 107 and may comprise, for example, a control switch, an inductor, a diode, and a capacitor. During example operation, the converter 1903 may receive an input voltage and current ($V_{conv}$, $I_{conv}$) and may produce an output voltage and current ($V_{out}$, $I_{out}$). The output voltage and current may be based on the input voltage and current, as well as the control input received from the feedback system (e.g., a control input to drive the switch when the converter 1903 comprises a boost converter). Modification of the control input of converter 1903 may alter the input current to the converter 1903 and may cause the converter 1903 to draw more or less power than the power level setting signal produced by the output regulation block 1905 (that produces an approximately constant power signal during the current mains cycle). In some embodiments, the converter 1903 may be loaded by another circuit such as the output regulator block 1905 that may be connected between the output of the converter 1903 and ground.

Output regulator block 1905 may comprise a circuit that receives the output signal produced by the converter 1903 and may produce a power level setting signal based on, for the example, the difference between the received output value and a reference value. In some embodiments, the output regulator block 1905 may comprise an amplifier, such as an error amplifier, that may produce a power level setting signal based on the received output signal from the converter 1903. In other embodiments, the output regulator block 1905 may comprise other components that may compare the output with a reference, such as a sample-and-hold circuit. In some embodiments, the output regulator block 1905 may include a local regulation loop and a buffer capacitor connected between the output of the converter 1903 and ground. In such instances, the buffer capacitor may deliver high-frequency content of the load current that is received by the output regulator block 1905. The feedback system may use the power level setting signal to create the control input for the converter 1903. In some embodiments, the converter 1903 may produce a constant power output when the feedback system is modifying the operation of the converter. In some embodiments, the output regulator block 1905 may produce a power level setting signal as an input for the scaler 1919.

As shown in FIG. 19, the feedback system may combine both an error signal from the adder 1915 and a power level setting signal based on the output regulator block 1905. In producing the error signal, the feedback system may use a desired mains current shape 1911. Desired mains current shape 1911 may be hardware that produces a signal that includes the same current shape as the desired mains current as would be received from an AC power source or derived from the output of the rectifier stage. This may involve, for example, producing a signal with the same shape as the expected signal received from the AC power source. In some embodiments, the produced signal may have the same amplitude and/or phase as the expected signal. A person of skill in the art would be aware of practical hardware capable of generating an ideal sinusoidal current wave for the feedback power control circuit 1900.

In some embodiments, the feedback system may retrieve the desired mains current shape by, for example, sensing the AC mains voltage before or after the rectifier stage 1901. In some embodiments, the desired mains current shape block 1911 may comprise one or more voltage dividers connected to the input of the feedback power control circuit 1900 before the rectifier stage 1901. In such embodiments, the one or more resistor dividers may be connected in series to sense a voltage proportional to the AC mains voltage delivered to the rectifier stage 1901. In other embodiments, the desired AC mains current shape may be sensed through one or more resistor dividers at the output of the rectifier stage 1901. In such instances, the desired mains current shape stage 1901 may comprise existing circuit hardware connected to the feedback power control circuit 1900 for other purposes, such as, for example, overvoltage-protection. When sensing the output of the rectifier stage 1901, the sensed voltage $V_{in}$ may never reach zero, even during the zero-crossings of the AC mains voltage.

Scalers 1913, 1919 may combine inputs so that the resultant output signal is within a normal operating range. For example, in the illustrative embodiment, the scaler 1913 may receive the desired mains current shape 1911 and a power level setting output by the output regulator block 1905. Scaler 1913 may, for example, comprise a multiplier that combines the two inputs so that the output of the scaler 1913 is an adapted mains current shape signal that is based on the actual output power of the converter 1903. This may, for example, match the amplitudes of the desired mains current and sensed input current received at the adder 1915. In some embodiments, the scaler 1913 may not exactly match the amplitudes of the desired current shape signal and the sensed input current; in such instances, scaler 1919, in combination with the gain of the path formed by the scaler 1913, the adder 1915, and the clamp 1917, may define the control input to the converter 1903 may compensate for the amplitude difference.

Similarly, the scaler 1919 may comprise, for example, a multiplier that receives an adapted error signal from the clamp 1917 and the power level setting signal from the output regulator block 1905 and may produce a control input for the converter 1903 that compensates for the adapted error signal. In some embodiments, the scalers 1913, 1919 may be coupled. For example, when the scalers 1913, 1919 are multipliers, there may be a set, constant ratio between the scalers 1913, 1919 where reconfiguring one scaler 1913 to may lead to reconfiguring the other scaler 1919 maintain a constant ratio between the scalers 1913, 1919. In some embodiments, the scalers 1913, 1919 may be configured so that they are identical in scaling their respective received inputs.

Adder 1915 may receive the adapted mains current shape signal and a sensed input current before the filter 1902 and may combine the received inputs to produce an error signal. The sensed input signal $I_{rect}$ may be sensed before the filter 1902 and may include both the current received by the converter $I_{conv}$ and the current received by the capacitive filter $I_{cap}$. When the current received by the converter 1903 is modified to include a current opposite the current received by the capacitive filter 1902 so that $I_{rect}=I_{cap}+(I_{conv}-I_{cap})$, the sensed current may be the same shape as the desired mains current. In some embodiments, the adder 1915 may functionally act as a subtractor, receiving one of the signals as a negative value and adding the differently-signed signals to produce the error signal. In the illustrative embodiment, for example, the adder 1915 may receive the adapted mains current shape signal as a negative value.

Clamp 1917 may control the range current signals for which the error signal alters the control input produced by the scaler 1919. During parts of the AC mains cycle, it may not be possible for the feedback system to adapt the converter 1903 sufficiently to compensate for the current received by the filter. This may occur, for example, around the zero-crossings of the AC mains voltage: just before the zero-crossing (where $I_{cap}$ is at a minimum), the converter 1903 may require an infinite amount of current for compensation, while just after the zero-crossing (where $I_{cap}$ is at a maximum), the circuit 1900 may require the current delivered to the converter 1903 to be negative. The clamp 1917 may comprise, for example, a circuit of clamping diodes and reference sources that may produce an error signal limited between an upper and lower border for the scaler 1919 when the received error signal is outside of a range set by one or more reference sources. For example, in one embodiment, the circuit may comprise clamping diodes in series with a plurality of reference voltages (in such instances, the clamp 1917 may further comprise a compensation network that converts the error signal to a voltage signal). When the error voltage signal is between the two reference voltage levels, the (current) error signal may be sent to the scaler 1919; otherwise, the clamping diodes may cause a current error signal equal to the minimum or maximum of the defined range (set by the reference voltages) to be sent to the scaler 1919.

In an example method of operation by the feedback power control circuit 1900, the rectifier stage 1901 may produce a rectified signal including a current shape. The rectified signal may be received by both a filter 1902 and a converter 1903, which each receive currents from the rectified signal. A feedback system that produces an error signal based at least on a sensed current signal, may produce a current input for the converter 1903. Based on the control input, the converter 1903 may alter its operation to modify the current it receives from the rectifier stage 1901. In some embodiments, the change in current received by the converter 1903 may be substantially equal to the current received by the filter 1902. The feedback system may produce the control input for the converter by sensing the current before filter 1902, comparing the sensed current signal to a desired current signal, and producing an error signal based on the comparison. When the error signal is within a defined (non-clamping) range, the error signal be combined with a power level setting signal to modify the converter 1903 based on both the derived current error and the actual output of the circuit 1900.

In some example methods of operation, the feedback power control circuit 1900 may use one or more scalers to modify incoming signals to better match the power level settings. For example, in some embodiments, the scaler 1913 may receive the desired mains current shape and may scale the desired mains current shape using the power level setting signal. In some embodiments, the scaler 1919 may receive the error signal from the adder 1915 or the clamp 1917 and may scale the power level setting signal it received by the error signal. In various embodiments, the scalers 1913, 1919 may comprise multipliers that may multiply the input signals together; in some embodiments, the scalers 1913, 1919 may also multiply their inputs by a non-zero constant.

In some example methods of operation, the clamp 1917 may limit the operational range of the feedback system by only producing a non-zero error signal within a non-clamping range. For example, if the clamp receives an error signal that would require the current received by the converter 1903 to be negative, the clamp 1917 may produce an error signal equal to the minimum in the defined range.

Figure 20:
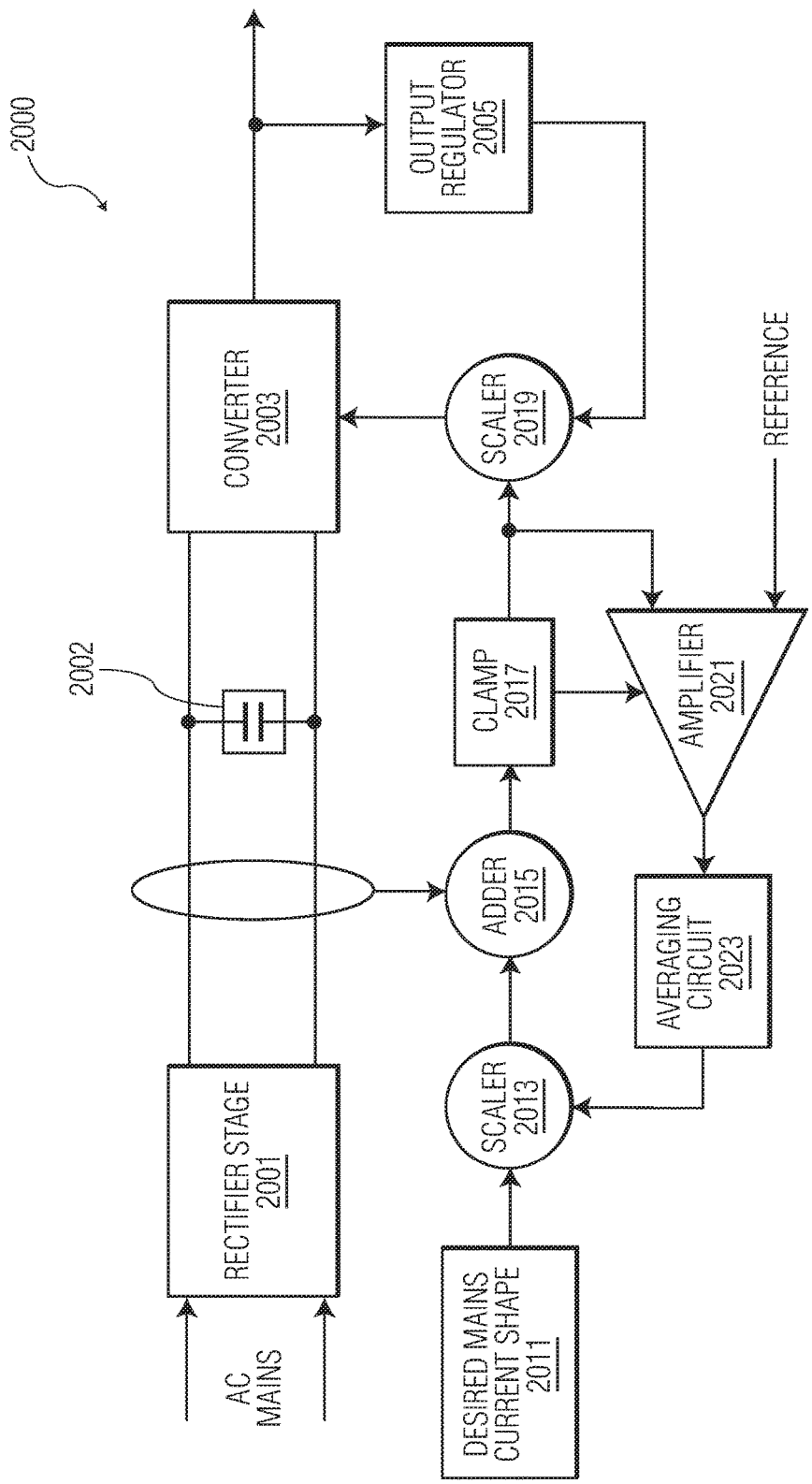
FIG. 20 is schematic diagram of another example feedback power control circuit.

FIG. 20 is schematic diagram of another example feedback power control circuit. Feedback power control circuit 2000 is similar to feedback power control circuit 1900 with components 2001-2019 similar to like components 1901-1919. Feedback power control circuit 2000 additionally comprises an amplifier 2021 and an averaging circuit 2023. In the illustrative embodiment, the scaler 2013 receives an average value of the error signal to a reference voltage (when the feedback system is not clamping). This may allow the feedback system to match the average value of the sensed mains current (when not clamping) with that of the desired mains current.

Amplifier 2021 may produce an amplified error signal based on the error signal produced by the adder 2015 and the clamp 2017. Amplifier 2021 comprises, for example, a differential amplifier that receives the error signal and a reference signal. The reference signal may comprise, for example, a reference current level produced by a constant current source. Amplifier 2021 may receive an 'enable' signal from the clamp 2017 so that the amplifier 2021 only produces an amplifier error signal during periods when the feedback system is not clamping.

Averaging circuit 2023 may comprise a circuit that may produce an average error value based on the amplified error values received from the amplifier 2021. The averaging circuit 2023 may comprise, for example, a memory that may maintain an average over a defined period. For example, the averaging circuit may maintain an average of the error signal over an AC mains half-cycle period. Over the defined period, when the average of the error signal is equal to zero, the average value of the sensed mains current signal may match that of the average value of the desired mains current signal after scaling by the scaler 2013. In some embodiments, the clamp 2017 may be configured to not produce an enable signal when the feedback system would otherwise attempt to modify converter 2003 outside of acceptable limits. In such instances, the amplitudes of the current signals may match over a clamped period, with no attempt to match amplitudes occurring during the clamping periods. In other embodiments, the averaging circuit 2023 may maintain a continuous average of the error signal. This may occur when a sufficiently slow time constant is chosen for the averaging circuit 2023 so that the output of the averaging circuit 2023 is approximately constant.

In an example method of operation by the feedback power control circuit 2000, the rectifier stage 2001 may produce a rectified signal in a similar manner to the feedback power control circuit 1900 in FIG. 19. The feedback system may also act in a similar manner, with the adder 2015 received an adapted reference mains current signal and a sensed current signal and producing an error signal based on a comparison of the two input signals. Clamp 2017 may produce a control input signal when the error signal is within a defined range. When the error signal is in the defined range, the error signal may be sent to the amplifier 2021, where it is compared to a reference signal. When the clamp 2017 provides an enable signal for the amplifier 2021, the error signal may be sent to the averaging circuit 2023, where the error signal is used to produce an average error signal. Averaging circuit may then send the average error signal to the scaler 2013, which may use the average error signal when scaling the reference mains current shape signal 2011.

Figure 21:
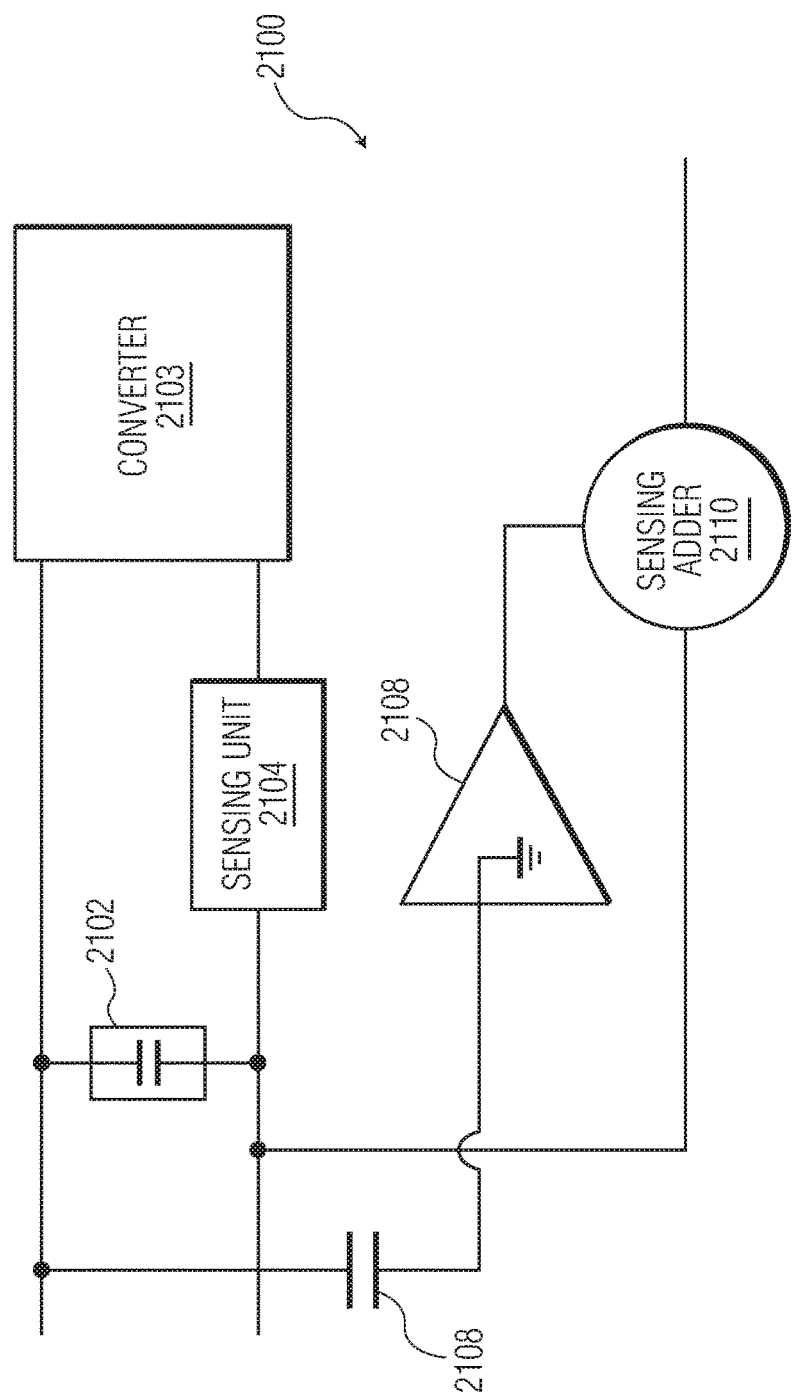
FIG. 21 is a schematic diagram of a sensing block of an example feedback power control circuit.

FIG. 21 is a schematic diagram of a sensing block of an example feedback power control circuit. Sensing circuit 2100 may comprise components 2102, 2103, similar to components 1902, 1903, of the feedback power control circuit 1900 of FIG. 19. Sensing circuit 2100 may also comprise a sensing unit 2104, a proportional capacitor 2106, a sensing amplifier 2108, and a sensing adder 2110 that may produce the sensed current signal for the adder 1915.

In the illustrative embodiment, for example, the sensing unit 2104 may comprise, for example, a resistor $R_{sense}$ that produces an initial sensing current $I_{sense}$ that is equal to the current received by the converter 2103. In some embodiments, the sensing unit 2104 may include an existing resistor present between the filter 2102 and the converter 2103, where the existing resistor may also control one or more components of the converter 2103. Use of an existing resistor may, for example, limit dissipation related to sensing the current that is input to the converter 2103. In addition, the proportional capacitor 2106 may comprise a capacitor proportional to the capacitor comprising the filter 2102 so that $C_{filter}=K*C_{prop}$, where K is a fractional constant (e.g., where K>>1).

Proportional capacitor 2106 may produce a current proportional to the current received by the capacitive filter 2102. The resultant current may then be amplified by the sensing amplifier 2108. Sensing adder 2110 may then combine the sensed current received at the converter with the proportional current amplified by the sensing amplifier 2108 to produce a sensed current signal for the adder 1915.

Figure 22:
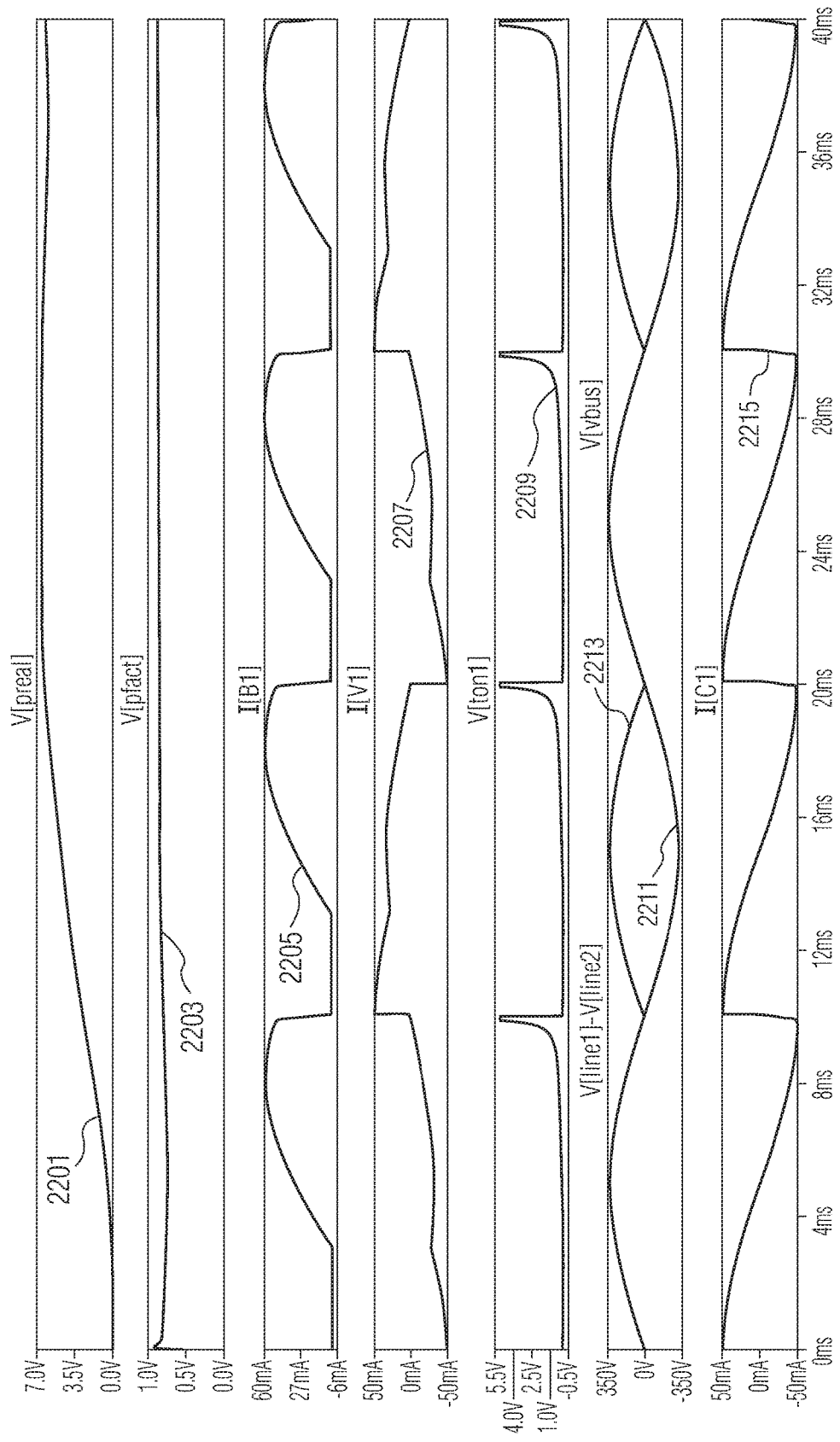
FIG. 22 is a timing diagram of an example feedback power control circuit.

FIG. 22 is a timing diagram of an example feedback power control circuit. Lines 2201-2215 illustrate the voltages and currents of various nodes in the feedback power control circuit 1900. Lines 2201-2203 illustrate the respective real power and power factor outputted by the circuit 1900. Line 2205 illustrates the current received by the converter 1903 and Line 2207 illustrates the input current from the AC mains. Line 2209 illustrates the control input of the converter 1903. Lines 2211-2213 illustrate the AC mains voltage and the rectified voltage (from the rectifier stage 1901), respectively. Line 2215 illustrates the current received by the capacitive filter 1902.

As shown in lines 2201-2215, the control input of the converter 1903 is modified so that the current received by the converter 1903 is modified over the AC mains cycle period. The current received by the converter 1903 is approximately the inverse of the current received by the capacitive filter 1902. Over time, the average power over a mains cycle produced by the circuit 1900 settles at a steady constant level, while the power factor also settles to a constant value.

Although the various example embodiments have been described in detail with particular reference to certain example aspects thereof, it should be understood that the invention is capable of other embodiments and its details are capable of modifications in various obvious respects. As is readily apparent to those skilled in the art, variations and modifications may be implemented while remaining within the spirit and scope of the invention. Accordingly, the foregoing disclosure, description, and figures are for illustrative purposes only and do not in any way limit the invention, which is defined only by the claims, taken alone, or in combination. As will be further apparent to those skilled in the art, embodiments of the invention explicitly include combinations features listed in separate claims, irrespective of whether such features are each individually defined in the same claim, are defined in an explicit chain of dependencies of claims, or a combination or claims which are not listed as dependant in the example set of claims below.

What is claimed is:

1. A circuit configured to control power delivered to a load by an AC/DC power converter, the AC/DC power converter configured to receive a mains alternating current (AC) voltage as an input, the mains AC voltage having a mains voltage cycle of an absolute voltage value varying in a cyclic manner from a first zero to a second zero over a cycle period, the cycle period having a first half-cycle period during which the absolute voltage value increases from the first zero to a maximum, and a second half-cycle period during which the absolute voltage value decreases from the maximum to the second zero, the circuit comprising:
   a rectifier configured to receive the mains AC voltage and produce a direct-current (DC) voltage;
   a switched mode power supply (SMPS) configured to receive the DC voltage, produce an output voltage, and provide the output voltage and a drive current to the load, the SMPS including a control switch, being switchable between an ON and an OFF state and only conducting during said ON state to control the output voltage and drive current delivered to the load;
   a filter configured to receive a filter current;
   a feedback control circuit configured to drive the control switch between the ON and OFF states, wherein the feedback control circuit shifts the drive current relative to the mains voltage cycle by generating a error signal based on a difference between a reference mains current signal and a sensed current signal at an output of the rectifier, and modifying the drive current based on the error signal so that the reference mains current signal and the sensed current signal have current shapes based upon an input desired mains current shape;
   a first scaling unit configured to receive the error signal and a power level signal based on the output voltage and produce a control input to control the drive current;
   a second scaling unit configured to receive the reference mains current signal and the power level signal based on the output voltage and produce an adapted reference mains current signal; and
   an averaging circuit configured to receive a plurality of error signals during a defined period of at least the first or second half-cycle periods of the mains AC voltage and produce an average error signal based on an average of the plurality of error signals received during the defined period, wherein the feedback control circuit modifies the drive current based on the average error signal.

2. The circuit of claim 1, wherein the first and the second scaling units comprise multipliers.

3. The circuit of claim 1, further comprising:
   an output regulator that is configured to control the power level based on receiving the output voltage.

4. The circuit of claim 1, wherein the second scaling unit is configured to receive the reference mains current signal and the average error signal and produce the adapted reference mains current signal.

5. The circuit of claim 1, further comprising:
   an adder configured to receive the sensed current and the reference mains current signal and produce the error signal.

6. The circuit of claim 1, further comprising:
   a clamp circuit configured to receive the error signal and modify the error signal to a minimum or maximum value within a defined operating range when a value of the received error signal is outside of the defined operating range.

7. The circuit of claim 1, wherein the feedback control circuit is configured to derive the reference mains current signal from the voltage produced at an output of the rectifier.

8. The circuit of claim 1, wherein the feedback control circuit is configured to derive the reference mains current signal from the mains AC voltage.

9. The circuit of claim 1, further comprising:
an adder configured to receive the adapted reference mains current signal and produce the error signal.

* * * * *

UNITED STATES PATENT AND TRADEMARK OFFICE
CERTIFICATE OF CORRECTION

PATENT NO. : 9,531,257 B2  
APPLICATION NO. : 13/513992  
DATED : December 27, 2016  
INVENTOR(S) : Cheng Zhang and Hans Halberstadt It is certified that error appears in the above-identified patent and that said Letters Patent is hereby corrected as shown below:

On the Title Page

Item [54], and in the Specification, Column 1 Line 1 should read POWER FACTOR CORRECTOR WITH HIGH POWER FACTOR AT LOW LOAD OR HIGH MAINS VOLTAGE CONDITIONS Signed and Sealed this
Fourteenth Day of April, 2020

Andrei Iancu
*Director of the United States Patent and Trademark Office*